United States Patent
Abdel-Fattah et al.

(10) Patent No.: US 11,053,788 B2
(45) Date of Patent: Jul. 6, 2021

(54) ACOUSTIC DOWNHOLE OIL-WATER SEPARATION

(71) Applicant: Saudi Arabian Oil Company, Dhahran (SA)

(72) Inventors: Amr Abdel-Fattah, Dhahran (SA); Brian A. Roth, Dhahran (SA); Wessam A. Busfar, Al-Khobar (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 219 days.

(21) Appl. No.: 15/373,108

(22) Filed: Dec. 8, 2016

(65) Prior Publication Data

US 2017/0175509 A1 Jun. 22, 2017

Related U.S. Application Data

(60) Provisional application No. 62/267,991, filed on Dec. 16, 2015.

(51) Int. Cl.
*E21B 43/38* (2006.01)
*E21B 43/08* (2006.01)
(Continued)

(52) U.S. Cl.
CPC .............. *E21B 43/38* (2013.01); *B01D 17/04* (2013.01); *C02F 1/36* (2013.01); *E21B 43/08* (2013.01);
(Continued)

(58) Field of Classification Search
CPC ........ E21B 43/38; E21B 43/08; E21B 43/385; E21B 43/35; B01D 17/04; B01D 17/02; B01D 43/00; B01D 49/00; B01D 49/006; C02F 1/36; C02F 2103/10; C02F 2101/32; B06B 1/06–0659
See application file for complete search history.

(56) References Cited

U.S. PATENT DOCUMENTS 3,534,816 A * 10/1970 Showalter ............... E21B 43/04
166/205
4,960,525 A 10/1990 Dalby et al.
(Continued)

FOREIGN PATENT DOCUMENTS

WO 2015107014 A1 7/2015

OTHER PUBLICATIONS

The International Search Report and Written Opinion for related PCT application PCT/US2016/066826 dated Mar. 1, 2017.
(Continued)

*Primary Examiner* — George S Gray
(74) *Attorney, Agent, or Firm* — Bracewell LLP; Constance G. Rhebergen; Linda L. Morgan

(57) ABSTRACT

Systems and method for separating hydrocarbon fluids from water and solid material within a main tubular of a subterranean well include locating a transducer assembly within the subterranean well, the transducer assembly including a plurality of piezo electric transducers spaced along a length of the main tubular. Standing acoustic waves are generated with the plurality of piezo electric transducers, the standing acoustic waves passing through the main tubular transverse to the central axis. A number of loops of the standing acoustic waves decrease in a direction of flow of fluids through the main tubular.

15 Claims, 12 Drawing Sheets

(51) Int. Cl.
*B01D 17/04* (2006.01)
*C02F 1/36* (2006.01)
*C02F 101/32* (2006.01)
*C02F 103/10* (2006.01)

(52) U.S. Cl.
CPC ........ *E21B 43/385* (2013.01); *C02F 2101/32* (2013.01); *C02F 2103/10* (2013.01)

(56) References Cited

U.S. PATENT DOCUMENTS

| | | | |
|---|---|---|---|
| 5,164,094 A | 11/1992 | Stuckart | |
| 5,344,532 A | 9/1994 | Joseph | |
| 5,345,655 A | 9/1994 | Bernhardt | |
| H1568 H | 8/1996 | Huang | |
| H1568 H * | 8/1996 | Huang | 210/702 |
| 5,740,860 A * | 4/1998 | Crawford | E21B 17/028 166/117.6 |
| 5,996,690 A | 12/1999 | Shaw et al. | |
| 6,213,208 B1 | 4/2001 | Skilbeck | |
| 6,336,503 B1 | 1/2002 | Alhanati et al. | |
| 6,929,750 B2 | 8/2005 | Laurell et al. | |
| 7,766,121 B2 | 8/2010 | Hadfield et al. | |
| 7,846,382 B2 | 12/2010 | Strand et al. | |
| 2006/0037915 A1 * | 2/2006 | Strand | B01D 21/283 210/748.05 |
| 2008/0124779 A1 * | 5/2008 | Oh | B01L 3/502761 435/173.9 |
| 2009/0065431 A1 * | 3/2009 | Bakke | B01D 17/0217 210/512.1 |
| 2011/0278218 A1 | 11/2011 | Dionne et al. | |
| 2012/0006543 A1 | 1/2012 | Cox et al. | |
| 2012/0043075 A1 * | 2/2012 | Abramova | E21B 43/003 166/249 |
| 2012/0055262 A1 | 3/2012 | Sinha | |
| 2013/0284271 A1 * | 10/2013 | Lipkens | B01D 43/00 137/1 |
| 2014/0008307 A1 | 1/2014 | Guldiken et al. | |
| 2015/0300133 A1 * | 10/2015 | Songire | E21B 43/108 166/276 |
| 2017/0022796 A1 * | 1/2017 | Joshi | E21B 4/04 |

OTHER PUBLICATIONS

Doosti et al., "Water treatment using ultrasonic assistance: A review", Proceedings of the International Academy of Ecology and Environmental Sciences, 2012, pp. 96-110, IAEES.

Fattah et al., "Microscopic Behavior Of Colloidal Particles Under The Effect Of Acoustic Stimulations In The Ultrasonic To Megasonic Range", Innovations in Nonlinear Acoustics: 17th International Symposium on Nonlinear Acoustics, 2006, pp. 186-190, AIP.

Khan, "Produced Water Technologies: A Review of Downhole Water Separation Innovations", 2014 Water Management Forum Saudi Aramco, 2014, pp. 1-32, Saudi Aramco.

Leong et al., "Ultrasonic Separation of Particulate Fluids in Small and Large Scale Systems: A Review", I &EC Research, 2013, pp. 16555-16576, vol. 52, ACS Publications.

* cited by examiner

ACOUSTIC DOWNHOLE OIL-WATER SEPARATION

CROSS REFERENCE TO RELATED APPLICATION

This application claims priority to and the benefit of U.S. Provisional Application Ser. No. 62/267,991, filed Dec. 16, 2015, titled "Acoustic Downhole Oil-Water Separation," the full disclosure of which is hereby incorporated herein by reference in its entirety for all purposes.

BACKGROUND OF THE DISCLOSURE

1. Field of the Disclosure

The present disclosure relates generally to the development and production of hydrocarbon-bearing formations. More specifically, this disclosure relates to systems and methods for separating hydrocarbons and solid fines from water for improving hydrocarbon recovery from hydrocarbon-bearing formations and reducing produced water volumes pumped to the surface.

2. Description of the Related Art

Produced water can be one of the largest volume waste streams generated in oil and gas development and production. The cost of handling produced water is significant and the potential of contaminating the environment is high when produced water is brought to surface. The produced water has to be properly handled and treated prior to disposal, or it has to be filtered and treated before re-injection into the formation. Produced water separation, treatment and disposal per barrel of hydrocarbon fluid can be expensive given the amount of chemicals and additives required in addition to the on-site infrastructure—temporary or permanent—needed to process the water-laden hydrocarbon. Management of produced water presents challenges and costs to operators and to the environment.

Downhole oil-water separation systems are intended to reduce the amount of water produced to surface in order to minimize the surface facility requirements for separating and treating water. In downhole oil-water separation systems, hydrocarbons are separated from water inside a well. If the entire process of lifting, treating, and reinjecting produced water can be avoided, costs and environmental impacts are generally reduced. With downhole oil-water separation systems, hydrocarbon-rich fluid is produced to the surface while a water-rich stream is redirected and injected into an underground formation, for example, a second well leg or a non-hydrocarbon-bearing and porous part of the reservoir, without being lifted to the surface.

One type of downhole oil-water separation system uses a hydrocyclone to mechanically separate oil from water and direct the two products away from one another. Another type of downhole oil-water separation system relies on gravity separation that takes place in the well bore. A third type of downhole oil-water separation system that potentially could be used is a membrane separation-based system, but there is not currently wide acceptance of this type of system given that other downhole oil-water separation systems are well-established and proven technologies with known economic feasibility.

Current downhole oil-water separation systems, however, suffer from several systemic problems. Current methods mandate high costs and require specific conditions to function properly. Some current methods also intervene with the flow stream in the production well, causing significant pressure drops. Many downhole oil-water separation systems are abandoned or are no longer performing to their full potential due to various factors. One reason may include plugging or low permeability at the injection zone for the formation that is to receive the production water (fines including sands, insoluble salts, minerals and clays; hydrocarbon residuum). In some current systems, the quality of the separated water does not meet sufficient standards to be re-injected into the disposal or re-injection zone. Also, the separation mechanisms are not able to operate at low water cut percentages and if the water-cut percentage changes significantly mechanical designed separators, such as gravity or hydrocyclone separators need to be changed in order to provide the same water removal efficiency.

SUMMARY OF THE DISCLOSURE

Embodiments of the present disclosure provide systems and method for using standing acoustic waves in an oil production tube to separate oil droplets and solid fine particles from water before reaching the surface. The oil and solids are concentrated in separate regions within the production tube where each phase can be redirected and managed independently. Embodiments of this disclosure increase the volume of oil while decreasing the volume of produced water pumped to the surface. The water with low solid fines load at the bottom of the well can be rejected into the formation with a lower risk of pore clogging and formation damage.

Systems and methods described in this disclosure provide for the separation of fines from produced water at the bottom of the well. Embodiments of this disclosure overcome pressure drop and mechanical parts failure common to current techniques. A plurality of piezo electric transducers aligned on the outside perimeter of the main tubular, or as part of a separate tubular tool lowered into the production tubing, can be driven by function generators and power amplifiers situated and monitored at the surface. The frequency of the applied acoustic waves is adjusted to generate standing acoustic waves of different amplitudes and loop numbers inside the main tubular in the direction perpendicular to flow. The piezo electric transducers are aligned in such a way that standing acoustic waves have a number of loops that decrease towards the surface. As an example, the lowermost standing acoustic wave can have a large number of loops and the uppermost standing acoustic wave can have a small number of loops.

In addition, embodiments of this disclosure can be used for waterflooding if suitable water with low fines load is generated and redirected into the oil-producing zone. In this case, systems and methods described in this disclosure could also be used for reverse coning to reduce the degree of water influx into oil-producing zones.

In an embodiment of this disclosure a method for separating hydrocarbon fluids from water and solid material within a main tubular of a subterranean well includes locating a transducer assembly within the subterranean well. The main tubular has a central axis. The transducer assembly includes a plurality of piezo electric transducers spaced along a length of the main tubular. Standing acoustic waves are generated with the plurality of piezo electric transducers, the standing acoustic waves passing through the main tubular transverse to the central axis. A number of loops of the standing acoustic waves decrease in a direction of flow of fluids through the main tubular.

In alternate embodiments of this disclosure, the transducer assembly can be located outside of an inner diameter of the main tubular. The step of generating standing acoustic waves can include providing power to the transducer assembly from a power source outside of the subterranean well. A production tubular can be provided in the subterranean well, an end of the production tubular aligned with a pressure antinode of an uppermost standing acoustic wave. A solid particle filter can be aligned with a pressure node of an uppermost standing acoustic wave to filter solid particles from a dirty water stream to form clean water. The clean water can be injected into a hydrocarbon formation.

In other alternate embodiments of this disclosure, the step of generating standing acoustic waves can include generating standing acoustic waves with pressure nodes adjacent to a sidewall of the main tubular and having a number of pressure antinodes that is one less than a number of pressure nodes. The step of locating the transducer assembly within the subterranean well can include lowering a downhole tool having the transducer assembly into the subterranean well, or can include landing the main tubular within the subterranean well when the transducer assembly is secured to the main tubular.

In another embodiment of this disclosure, a method for separating hydrocarbon fluids from water and solid material within a main tubular of a subterranean well includes locating a transducer assembly within the subterranean well. The main tubular has a central axis and the transducer assembly includes a plurality of piezo electric transducers spaced along a length of the main tubular. Standing acoustic waves are generated with the plurality of piezo electric transducers, the standing acoustic waves passing through a fluid flowing in the main tubular. The uppermost standing acoustic wave has a pressure antinode axially registered with a production tubular that extends to an upper end of the subterranean well. A number of pressure antinodes of each other standing acoustic wave is at least equal to a number of pressure antinodes of the uppermost standing acoustic wave.

In alternate embodiments of this disclosure, the method also can include tuning the standing acoustic waves with a controller outside of the subterranean well, to adjust a number of loops and amplitude of the standing acoustic waves. A solid particle filter can be provided in the subterranean well, the solid particle filter axially registered with a pressure node of the uppermost standing acoustic wave. A water conduit can be provided in the subterranean well, the water conduit having an end axially registered with a pressure node of the uppermost standing acoustic wave. The step of generating standing acoustic waves can include generating standing acoustic waves with pressure antinodes adjacent to a sidewall of the main tubular and having a number of pressure nodes that is one less than a number of pressure antinodes.

In yet another embodiment of this disclosure, a system for separating hydrocarbon fluids from water and solid material within a main tubular of a subterranean well includes a transducer assembly located within the subterranean well. The main tubular having a central axis and the transducer assembly includes a plurality of piezo electric transducers spaced along a length of the main tubular. The piezo electric transducers are located to generate standing acoustic waves passing through the main tubular in a direction transverse to the central axis. The piezo electric transducers are aligned and operable to generate standing acoustic waves with a number of loops that decrease in a direction of flow of fluids through the main tubular.

In alternate embodiments, the transducer assembly can be located outside of an inner diameter of the main tubular. A power source can be located outside of the subterranean well and in be electrical connection with the transducer assembly. A production tubular can be located in the subterranean well, an end of the production tubular being aligned with a pressure antinode of an uppermost standing acoustic wave. A solid particle filter can be located in the subterranean well, the solid particle filter aligned with a pressure node of an uppermost standing acoustic wave and operable to produce a clean water for injection into a hydrocarbon formation.

In other alternate embodiments, the system can include a downhole tool, the downhole tool having the transducer assembly. Alternately, the transducer assembly can be secured to the main tubular. A controller can be operable to tune the standing acoustic waves to adjust a number of loops and amplitude of the standing acoustic waves, the controller being located outside of the subterranean well. A water conduit can be located in the subterranean well, the water conduit having an end axially registered with a pressure node of the uppermost standing acoustic wave.

BRIEF DESCRIPTION OF THE DRAWINGS

So that the manner in which features, aspects and advantages described in this disclosure, as well as others that will become apparent, are attained and can be understood in detail, a more particular description of the disclosure may be had by reference to the embodiments of this disclosure that are illustrated in the drawings that form a part of this specification. It is to be noted, however, that the appended drawings illustrate only example embodiments of the disclosure and are, therefore, not to be considered limiting of the disclosure's scope, for the disclosure may admit to other equally effective embodiments.

DETAILED DESCRIPTION OF THE DISCLOSURE

Figure 1:
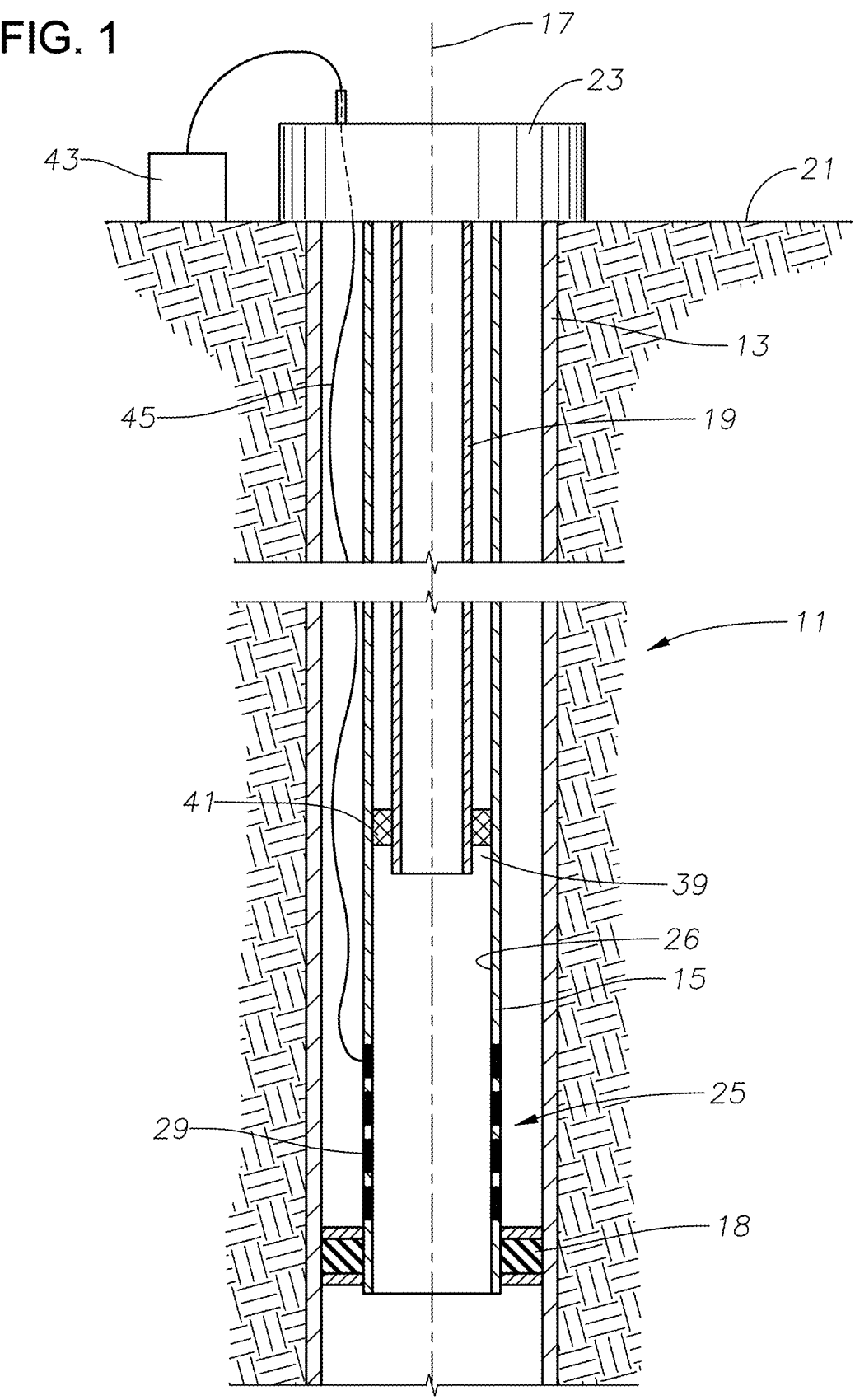
FIG. 1 is a schematic section view of a subterranean well having a transducer assembly in accordance with an embodiment of this disclosure.

Embodiments of the present disclosure will now be described more fully with reference to the accompanying drawings which illustrate embodiments of this disclosure. This disclosure may, however, be embodied in many different forms and should not be construed as limited to the illustrated embodiments set forth in this disclosure. Those of skill in the art understand that the disclosure is not limited to or by the description of embodiments given in the Specification. Rather, these embodiments are provided so that this disclosure will be thorough and complete, and will fully convey the scope of the disclosure to those skilled in the art. Like numbers refer to like elements throughout, and the prime notation, if used, indicates similar elements in alternate embodiments or positions.

In the following discussion, numerous specific details are set forth to provide a thorough understanding of the present disclosure. However, it will be obvious to those skilled in the art that the systems and methods of the present disclosure can be practiced without such specific details. Additionally, for the most part, details concerning well drilling, reservoir testing, well completion and the like have been omitted inasmuch as such details are not considered necessary to obtain a complete understanding of the present disclosure, and are considered to be within the skills of persons skilled in the relevant art.

Those of skill in the art also understand that the terminology used for describing particular embodiments does not limit the scope or breadth of the disclosure. In interpreting this disclosure, including the appended Claims, all terms should be interpreted in the broadest possible manner consistent with the context of each term. All technical and scientific terms used in this disclosure, including the appended Claims have the same meaning as commonly understood by one of ordinary skill in the art to which this disclosure belongs unless defined otherwise.

As used in this disclosure, the singular forms "a", "an" and "the" include plural references unless the context clearly indicates otherwise. The referenced elements, components or steps may be present, utilized or combined with other elements, components or steps not expressly referenced. "Associated" and its various forms means something connected with something else because they occur together or that one produces the other. "Detect" and its conjugated forms should be interpreted to mean the identification of the presence or existence of a characteristic or property. "Determine" and its conjugated forms should be interpreted to mean the ascertainment or establishment through analysis or calculation of a characteristic or property.

Spatial terms describe the relative position of an object or a group of objects relative to another object or group of objects. The spatial relationships apply along vertical and horizontal axes. Orientation and relational words, including "uphole" and "downhole", are for descriptive convenience and are not limiting unless otherwise indicated.

Where this disclosure, including the appended Claims, provide a range of values, it is understood that the interval encompasses each intervening value between the upper limit and the lower limit as well as the upper limit and the lower limit. The disclosure encompasses and bounds smaller ranges of the interval subject to any specific exclusion provided.

Where this disclosure, including the appended Claims, reference a method comprising two or more defined steps, the defined steps can be carried out in any order or simultaneously except where the context excludes that possibility.

Looking at FIG. 1, an example hydrocarbon development with subterranean well 11 is shown. Although well 11 is shown as a vertical well, embodiments of this disclosure will apply equally to inclined or horizontal wells. Well 11 can be lined with a casing 13, or can be free of casing. Main tubular 15 can extend within well 11. Main tubular 15 is shown concentric around central axis 17 of main tubular 15. Main tubular 15 has an open lower end for providing access for production fluids from within subterranean well into main tubular 15. Such fluids can include, for example, hydrocarbons in liquid and gas form, and water, as well as solids that are carried by the hydrocarbons and water. Outer packer 18 can seal the annular space between the outer diameter of main tubular 15 and the inner diameter of casing 13.

Production tubular 19 also extends within casing 13. Production tubular 19 can be located within, and be circumscribed by, main tubular 15. Production tubular 19 can be concentric with main tubular 15 around central axis 17 so that production tubular 19 is coaxially aligned with central axis 17 of main tubular 15 and central axis 17 of main tubular 15 is also a central axis of production tubular 19. Production tubular 19 extends to an upper end of subterranean well 11 and can deliver produced fluids to outside of subterranean well 11, such as to the earth's surface 21 by way of wellhead 23. In certain embodiments, main tubular 15 can also extend to an upper end of subterranean well 11 (FIG. 1) and in other embodiments, main tubular 15 may circumscribe only a portion of main tubular 15 and not extend to the upper end of subterranean well 11 (FIG. 2).

The hydrocarbon development of FIG. 1 includes a system for separating hydrocarbon fluids from water and solid material within main tubular 15 of subterranean well 11. The system for separating hydrocarbon fluids has transducer assembly 25. Transducer assembly 25 is located within subterranean well 11. Transducer assembly 25 is associated with main tubular 15, but can be located outside of inner diameter 26 of main tubular 15 so that transducer assembly 16 does not interfere with the flow of fluids through main tubular 15 and therefore does not contribute to a pressure drop in the flow of fluids to wellhead 23. In addition, no system components are located radially inward from production tubular 19, or are radially aligned with the opening of production tubular 19. Components located radially inward from production tubular 19 or otherwise radially aligned with the opening of production tubular 19 could restrict access to the wellbore for equipment or tools, such as intervention equipment or logging tools. Embodiments disclosed herein provide for uninhibited access to the wellbore through production tubular 19. Well 11 can have a single transducer assembly 25, or can have multiple transducer assemblies 25 spaced along the length of well 11.

In certain embodiments, transducer assembly 25 is secured to main tubular 15 (FIG. 1). Transducer assembly 25 can be, for example part of a sidewall of main tubular 15 or secured to the outer diameter of main tubular 15.

Figure 2:
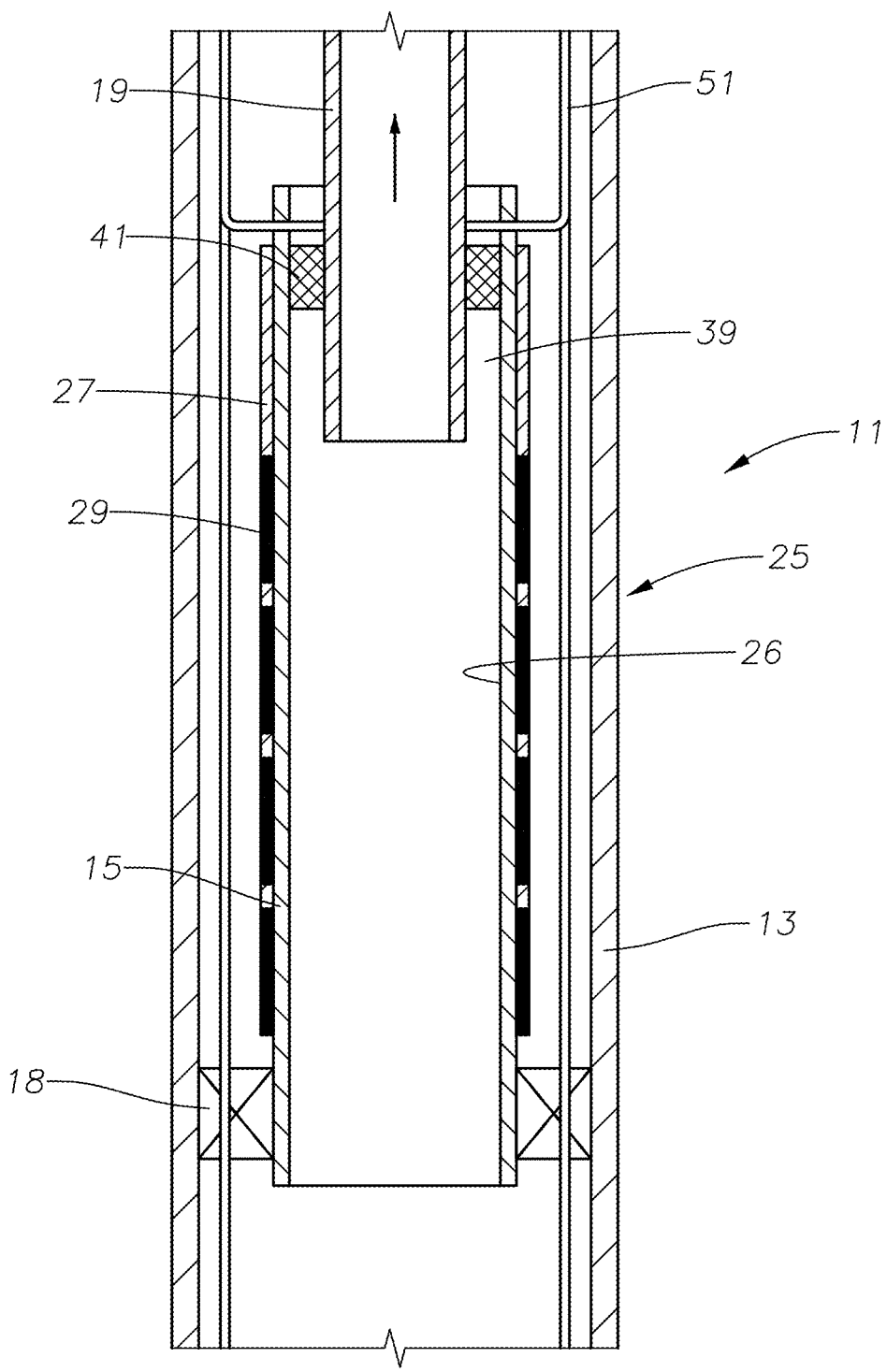
FIG. 2 is section view of a transducer assembly in accordance with an embodiment of this disclosure.

In other embodiments, transducer assembly 25 can be part of downhole tool 27 (FIG. 2). When transducer assembly 25 is part of downhole tool 27, downhole tool 27 can pass over an outer diameter of main tubular 15 so that transducer assembly 25 is located around the outer diameter of main tubular 15. When transducer assembly 25 is part of downhole tool 27, downhole tool 27 can be lowered into well 11 upon demand and lifted for routine maintenance or for trouble shooting. In such embodiments, downhole tool 27 could be utilized as a primary separation tool or as a secondary separation tool after a first separation of the components of the fluids flowing through main tubular is performed by another method or system, such as another transducer assembly 25 or a conventional hydrocyclone or gravity separator. In this way, transducer assembly 25 can be integrated with other downhole oil-water separation techniques to provide a hybrid downhole oil-water separation solution.

Figure 3:
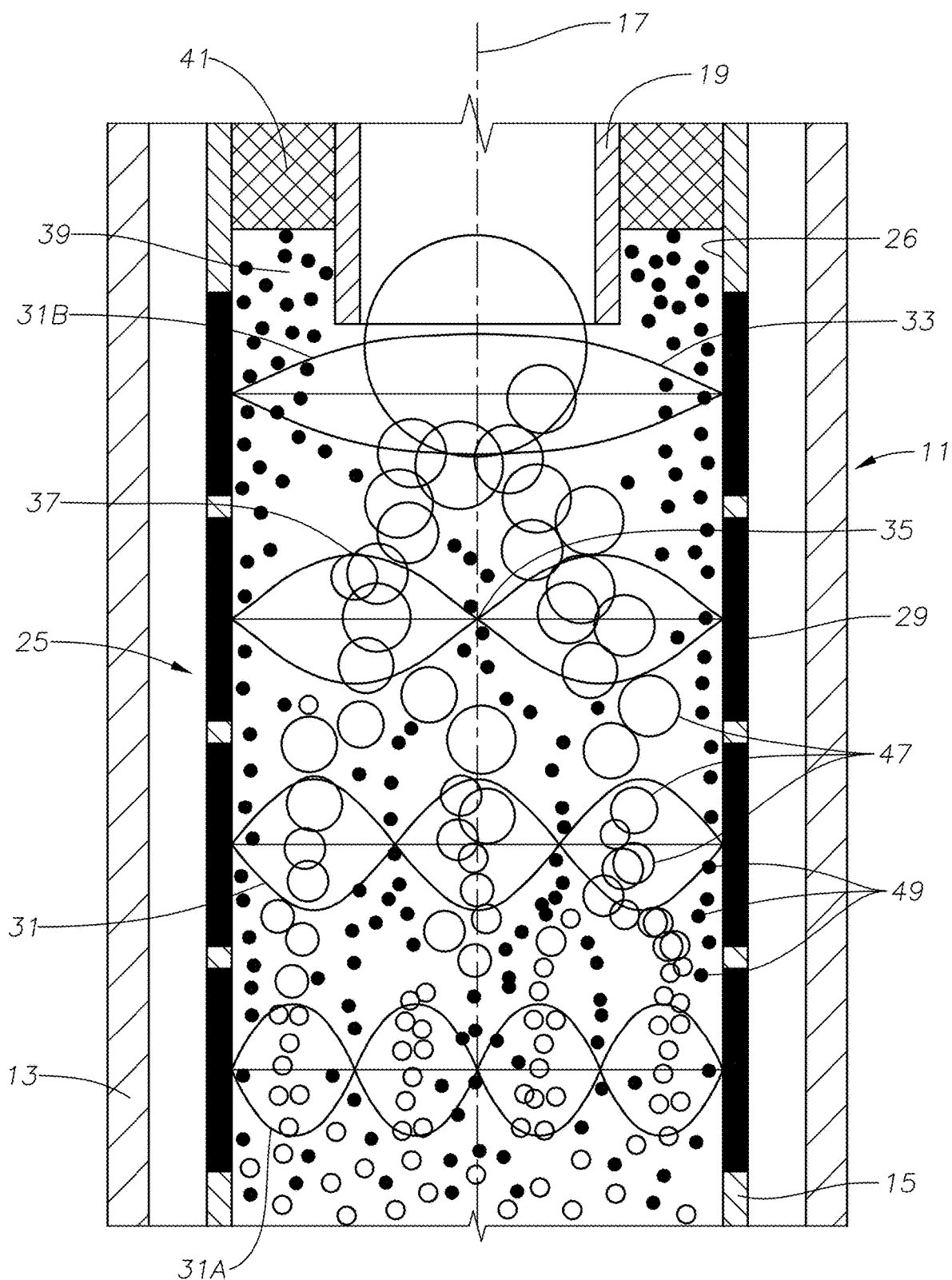
FIG. 3 is a transducer assembly in accordance with an embodiment of this disclosure, showing a representation of the standing acoustic waves.

Transducer assembly 25 includes a plurality of piezo electric transducers 29 spaced along a length of main tubular 15. The number of piezo electric transducers 29 used in each transducer assembly 25 will vary depending on several operational factors and will be determined based on such operational factors for a particular well 11. Such operational factors can include, as an example, flow rate within production tubular 19, the nature and composition of the fluid flowing through production tubular 19, the diameter of main tubular 15, and the temperature and pressure of temperature the fluid flowing through production tubular 19. Piezo electric transducers 29 can generate standing acoustic waves 31 (FIG. 3) passing through main tubular 15 in a direction transverse to central axis 17. Each of the piezo electric transducers 29 can generate a standing acoustic wave 31 that has a selected number of loops that is different that the number of loops of adjacent standing acoustic waves 31. Piezo electric transducers 29 are aligned and operable to generate standing acoustic waves 31 with a number of loops 33 that decrease in a direction of flow of fluids through main tubular 15. In the example of FIG. 3, where the fluids flowing through main tubular 15 are flowing upwards towards wellhead 23 (FIG. 1), the lowermost standing acoustic wave 31A can have a greater number of loops 33 and the uppermost standing acoustic wave 31B can have a lesser number of loops 33.

A loop is one half of a wave of loops 33. As an example, looking at FIG. 3, uppermost standing acoustic wave 31B is one half of a wave, which is equivalent to a single loop 33. Lowermost standing acoustic wave 31A is two waves in length and therefor has four loops 33. Each loop 33 has a pressure node 35 at each end of loop 33 and a pressure antinode 37 at a central location of loop 33. In the example embodiments, standing acoustic waves 31 have pressure nodes 35 adjacent to a sidewall of main tubular 15 and have a number of pressure antinodes 37 that is one less than the number of pressure nodes.

The amplitude of loops 33 and the number of loops 33 of standing acoustic waves 31 will vary depending on several operational factors and will be determined for the operational factors of a particular well 11. Such operational factors can include, as an example, flow rate within production tubular 19, the nature and composition of the fluid flowing through production tubular 19, the diameter of main tubular 15, and the temperature and pressure of the fluid flowing through production tubular 19. As an example, the number of loops 33 of lowermost standing acoustic wave 31A may be up to twenty. The number of loops 33 of uppermost standing acoustic wave 31B can be as low as one, or can be more than one.

Production tubular 19 is aligned within well 11 so that the lower end of production tubular 19 register with, and is aligned axially above, a pressure antinode 37 of uppermost standing acoustic wave 31B. Outside of production tubular 19 is a water conduit 39. Water conduit 39 can be all or part of the annular space between inner diameter 26 of main tubular 15, and the outer diameter of production tubular 19. Water conduit 39 can have an end axially registered with a pressure node 35 of uppermost standing acoustic wave 31B. In the example embodiments shown, water conduit 39 is located adjacent to a sidewall of main tubular 15.

Solid particle filter 41 can be located within water conduit 39. In an embodiment, solid particle filter 41 is aligned with a pressure node 35 of uppermost standing acoustic wave 31B. In alternate embodiments, solid particle filter 41 can be located at a different location that does not align with a pressure node 35 of uppermost standing acoustic wave 31B. As an example, solid filter 41 can align with a pressure node 35 of another of the standing acoustic waves 31. As an alternate example, solid filter 41 can be located along a length of water conduit 39 that does not necessarily align with any pressure node 35.

In order to make real time adjustments to the number of loops 33 and the amplitude of loops 33, a communication unit 43 can be in communication with transducer assembly 25. Communication unit 43 can be located outside of well 11, such as at the earth's surface 21 so that an operator can utilize communication unit 43. Communication unit 43 can include a controller operable to tune standing acoustic waves 31 to adjust the number of loops 33 and amplitude of standing acoustic waves 31. The controller of communication unit 43 can communicate with transducer assembly 25 through a wired connection 45, by wireless telemetry, or by other known communication means. The operator can utilize communication unit 43 to make changes to the number of loops 33 and amplitude of standing acoustic waves 31 to account for changing operational conditions or production requirements. Communication unit 43 can also include a power source in electrical connection with transducer assembly 25. The power source can include, for example, a generator and an amplifier.

In an example of operation, to separate hydrocarbon fluids from water and solid material within main tubular 15 of well 11 transducer assembly 25 is located within well 11. In the case of transducer assembly 25 being a part of downhole tool 27, transducer assembly 25 is located within well 11 by lowering downhole tool 27 into well 11. In the embodiment where transducer assembly 25 is secured to main tubular 15, transducer assembly 25 is located within well 11 by landing main tubular 15 within well 11.

The operator can then utilize communication unit 43 to generate standing acoustic waves 31 with piezo electric transducers 29. Standing acoustic waves 31 pass through main tubular 15 transverse to central axis 17 and, as will be further discussed in this disclosure, separate the oil from water and solids of the fluids flowing through main tubular 15.

Looking at FIG. 3, standing acoustic waves 31 generate primary and secondary acoustic radiation forces that influence oil droplets 47 and solid fines 49 differently due to the difference in their compressibility relevant to water. The primary acoustic forces will cause oil droplets 47 to move radially towards pressure antinodes 37 and cause solid fines 49 to move towards pressure nodes 35 of each of the standing acoustic waves 31. Oil droplets 47 and solid fines 49 are therefore separated from each in different axial locations along main tubular 15.

If a proper acoustic standing wave pattern, forming as the result of a perfectly timed interference of two waves travelling in opposite directions, is coupled to the oil-water-fines mixture in main tubular 15, the oil droplets 47 and solid fines 49 can be separated and extracted from the water. This separation technique involves both primary and secondary direct radiation forces generated by the standing acoustic waves 31, which drive the oil droplets 47 and solid fines 49 into different spatial regions in the acoustic field.

Secondary acoustic radiation forces enhance the coalescence of oil droplets 47 into larger droplets. Solid fines 49 are forced to cluster in pressure nodes 35 and secondary radiation forces cause them to form large clusters. As the size of the oil droplets 47 and particle clusters increases, the effectiveness of the primary and secondary acoustic radiation forces on separating and growing the oil droplets 47 and particle clusters increases even further as both forces scale with the droplet and cluster volumes. Some distance farther up in well 11 and before reaching the surface, the oil droplets 47 will eventually form oil ganglia that can be readily pumped to the surface at a high oil-to-water ratio. The decreasing number of standing wave loops 33 towards the top of main tubular 15 allows oil droplets 47 to be separated first at the bottom of main tubular 15 forming large ganglia in the center of the tube towards the top where they can be pumped to the surface by way of production tubular 19. Oil droplets 47 will therefore make up a significantly higher portion of the fluids produced to wellhead 23, relative to the concentration of oil droplets 47 in the fluids flowing more generally through main tubular 15. Because production tubular 19 is axially aligned over pressure antinode 37 of uppermost standing acoustic wave 31B, oil droplets 47, which are traveling axially through main tubular 15, will enter production tubular 19 and be produced to wellhead 23.

Similarly, the solid fines 49 form large clusters that can be readily filtered out, resulting in a produced clean water with a low fines load that can be injected back into the same formation. Water conduit 39, which contains solid particle filter 41, can be axially aligned with a pressure node 35 of uppermost standing acoustic wave 31B. A dirty water stream having water and solid fines 49 will enter water conduit 39 where solid fines 49 will be trapped by solid particle filter 41 and removed from the water. The resulting clean water can then be produced to the surface or can travel through water injection line 51 to be reinjected downhole. Because the clean water has a low load of solid fines 49, it can be re-injected into the formation without a high risk of pore clogging or formation damage.

Although the solid fines 49, water, and oil droplets 47 are described in example embodiments as being finally separated at the uppermost standing acoustic wave 31B, the separation of solid fines 49 from water, solid fines 49 from oil droplets 47, and water from oil droplets 47 can alternately occur at different axial locations within main tubular 15 based upon the tuning of piezo electric transducers 29. In this way, the location of the separation of components, such as the axial location of the removal of solid fines 49, can be optimized for a particular subterranean well 11. In such embodiments, the removal of solid fines 49 can be accomplished through the use of a removal solids trap at a location other than axially aligned with a pressure node 35 of uppermost standing acoustic wave 31B.

Systems and method described in this disclosure therefore provide a production flow with increased oil-to-water ratios at the surface as well as reduced solid fines 49 in the water, without obscuring the flow of fluid through main tubular 15, as shown in FIG. 1. The solid fines 49 and, oil droplet 47 and water will continue to flow steadily towards the earth's surface 21 past piezo electric transducers 29. Solid fines 49 will not be separated by settling time, which could hinder the flow of production, but will instead be directed to a separate solid filter 41 by way of water conduit 39 which is parallel to production tubular 19. Solid fines 49 can be separated from produced water and captured downhole. The injectivity of produced water for re-injection into the formation is increased by increasing the separation efficiency, and thus increasing water quality. This reduces or eliminates the contamination in the produced water pumped to the surface or re-injected into the formation, therefore reducing chemical treatment costs.

Embodiments of this disclosure are adjustable by an operator in real time to accommodate varying water cuts amounts. The acoustics can be adjusted to enhance downhole mixing of produced water, if desired. System and methods of this disclosure do not require high flow rates to operate and can be used for a large range of flow rates. There are no moving mechanical parts, the system is compact in size and easily installed and operated from the surface, and there is minimal maintenance required.

As further understanding of the driving forces for the separation of the oil droplets 47 and solid fines 49, an acoustic standing pattern is generated if the acoustic wave frequency is tuned to satisfy:

$$D = n\frac{\lambda}{2} (n = 1, 2, 3 \ldots)$$

where D is the tube inner diameter, $\lambda$ is the wavelength, and n is the harmonic number or number of loops in the standing wave pattern. D and $\lambda$ can have the same units. For example if $\lambda$ is measured in mm, D will be calculated in mm. The standing wave pattern consists of an alternating pattern of pressure nodes and pressure antinodes that are always located at the same positions along the excited medium. The standing wave pattern has n pressure antinodes and n+1 pressure nodes.

The standing wave patterns in the medium inside the main tubular generate time-averaged primary axial acoustic direct radiation force (DRF) in N exerted on both the oil droplets and fine particles, and is given by:

$$DRF_a = \frac{\pi P_0^2 V \beta_0}{2\lambda} \cdot \varphi(\beta, \rho) \cdot \sin\frac{4\pi z}{\lambda}$$

where $\varphi(\beta,\rho)$ is known as the contrast factor and is given by:

$$\varphi(\beta, \rho) = \frac{5\rho_p - 2\rho_0}{2\rho_p - \rho_0} - \frac{\beta_p}{\beta_0}$$

or $$\varphi(\beta, \rho) = \frac{5\frac{\rho_p}{\rho_0} - 2}{2\frac{\rho_p}{\rho_0} + 1} - \frac{\beta_p}{\beta_0} = \frac{5\hat{\rho} - 2}{2\hat{\rho} + 1} - \hat{\beta}$$

In these equations, subscript p refers to particle or droplet and subscript o refers to the continuous fluid phase (water), $P_0$ is the sound pressure amplitude in $N/m^2$, V is the volume of a dispersed particle in $m^3$, $\beta$ is the compressibility in $m^2/N$ (which is equal to $1/\rho c^2$ for liquids; where c is the speed of sound in the liquid in m/s), $\rho$ is the density in $kg/m^3$, and z is the distance away from the pressure node in m. $\varphi(\beta, \rho)$ is dependent on the density and compressibility of the dispersed particles relevant to the continuous phase. When these ratios result in a negative contrast factor, the axial direct radiation force is positive and particles are driven towards the pressure antinodes. Conversely, if the contrast factor is positive, the particles are driven towards the pressure nodes. Thus, the acoustic standing pattern provides not only a means to separate particles from a solution, but also to segregate particles that have opposite contrast factors, such as oil droplets and solid fines in the oil production tubes.

When the droplets or particles reach the antinodal or nodal planes, respectively, they experience secondary acoustic radiation forces (also known as the secondary Bjerknes forces). These forces are mainly attractive in the direction perpendicular to the sound propagation direction and thus enhance the coalescence of droplets or clustering of particles in the antinodal and nodal planes, respectively. As the droplets and particles grow in size, both the primary and secondary acoustic radiation forces become more significant, since both scale with the volume of droplets or particles, causing the separation process to become more efficient and the size of particles and droplets to grow rapidly as the fluids flow up the production well. As a result, standing waves with a smaller loop numbers can be applied in stages in the direction of the flow to force the oil droplets to form large ganglia in the center of the well, while larger fine clusters form near the walls of production tube as shown in FIG. 3.

Laboratory Results

1. Introduction

The acoustic ultrasound driven particulates clusters formation in dodecane oil droplets in water emulsions, colloidal silica microparticles suspensions as well as their mixtures microscopically, were observed microscopically in a simple microfluidic cell. Ultrasound of 300 KHz frequency was used for acoustic irradiation of the emulsion/suspension samples in a flat channel microfluidic cell. Looking at FIG. 4, the process was recorded using a high-speed video camera 100 equipped with a Nikon lens for the macroscopic observation or with the high-speed camera 100 attached to an inverted optical microscope 102 for the higher resolution microscopic observation of the process in each of the studied systems. The clustering process was characterized in the case of emulsion droplets, solid colloidal particles and ultimately demonstrated the concept for the emulsion droplets separation from the solid particle in the mixtures based on their different acoustic contrast factor. The experiment showed that the same approach can be used in a continuous fluid flow process.

The effectiveness of the acoustic separation for a given particulate dispersed in a medium is determined by the acoustic contrast factor, which is a dimensionless combination of the particulate and medium density and compressibility. In a standing acoustic wave particulates which are less compressible than the medium, and thereby have a positive acoustic contrast factor are drawn toward the node region of minimum pressure variation, on the other hand particulates which are more compressible then the medium, and have a positive acoustic factor are drawn toward the antinode regions of maximum pressure variation. Most of the studies conducted so far have used only one type of dispersed particulates, such as solid particles, biological cells, or emulsion droplets. The objective of this laboratory work was to use a simple microfluidic flow cell experimental setup to demonstrate the concept of an acoustic separation process for a mixture of components with opposite acoustic contrast factor, and more specifically separation of emulsions droplets and solid particles mixtures.

As a model emulsion dodecane oil droplets dispersed in water was used, and to model solid microparticle, monodisperse colloidal silica microspheres, in the size range of 0.15 µm to 7.5 µm was used. Such a combination of light hydrocarbon oil droplets and solid silicate particles is characteristic for the related processes in the crude oil production. Prior ultrasound separation studies have targeted a wide range of oil production related applications, such as tar recovery from oily sands, desalination and dehydration of crude oil, and oil separation from water. Most of these studies have been proof of concept investigations conducted on bench-top experimental setups using ultrasonic cleaners or homogenizer-type units. In spite of demonstrated promising results, so far to our knowledge, these have not resulted in commercially viable applications.

In the present investigation a simple flat channel microfluidic cell 104 with thickness of only 100 µm was chosen, which allows detailed microscopic observation of the particulate clustering process to be conducted in combination with larger view macroscopic observations. For the visualization of the process a state-of-the-art high-speed video camera was used. First the simpler case of single component emulsions of either droplets or solid particles solution was investigated. For the case of solid particles the use of monodisperse silica particles allows the minimum particulate size for effective acoustic separation in the setup to be established. Following this, the separation in the emulsion droplet and solid particle mixtures is investigated and finally proof of concept experiments demonstrating the continuous fluid flow separation of the dodecane droplets and silica particles is conducted.

2. Experimental Setup

Figure 6:
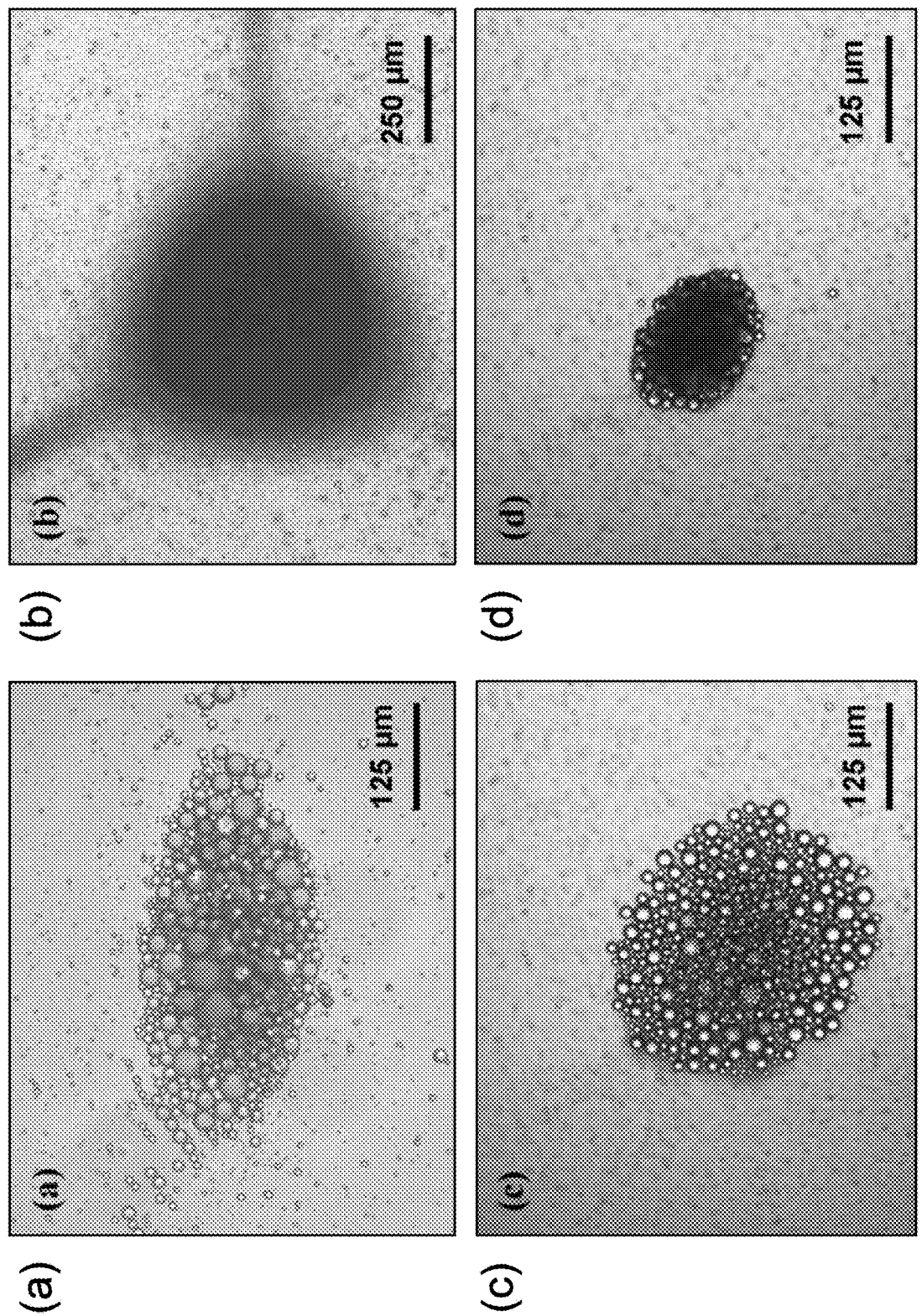
FIG. 6 includes microscopic observations showing high-speed video snapshots of dodecane emulsion droplet cluster formations.

The oil-in-water emulsions were prepared by mixing between 1 to 5 wt % of dodecane oil (99.0+%) with deionized water. To stabilize the emulsion 3×10−3 wt % of SPAN® 80 surfactant (Sigma-Aldrich) was added to the dodecane phase resulting in water—oil interfacial tension of about 7 mN/m. A surfactant that is only soluble in the oil phase is preferred to minimize the presence of acoustic bubbles in the emulsion. Two mixing protocols were used to prepare a coarser or a finer sized oil droplets. The coarse size emulsion was prepared by stirring the mixture for 5 minutes at 15000 rpm with a propeller disperser, resulting in oil droplets sizes in the range from 2 µm to 10 µm, as seen in FIG. 6. To prepare the finer droplets emulsion, the samples were further dispersed using a 20 KHz horn-type-transducer ultrasonic homogenizer. About 5 minutes of pulsating irradiation at 200 Watts resulted in finer emulsion droplet sizes in the range from 1 µm to 3 µm, as shown in (FIG. 6b). To minimize the effect of gravitational stratification the emulsion samples were used within 15 minutes following preparation.

In a limited number of experiments, perfluorohexane in the commercial form known as aFlutec® PP1 (F2 Chemicals Ltd., U.K.) was used as the oil phase. In this case the emulsion was stabilized by adding to the water phase 1×10−3 wt % of Zonyl® FSN (DuPont) which is a nonionic fluorosurfactant that modifies the interfacial energies at very low concentrations. In preparation of the perfluorohexane emulsions the same mixing protocol as for the fine dodecane droplets emulsion, as described, was used. This resulted in a similar size range for the perfluorohexane droplets of 1 µm to 3 µm.

Monodisperse silica particles suspensions of sizes 0.15 µm, 0.5 µm, 1.2 µm and 7.5 µm as 5 wt % aqueous suspensions were obtained. Before use, the silica particles were washed from the original suspension solution to remove surfactant traces. The standard concentration of silica microparticle in the deionized water suspension used was 1 wt % if not otherwise specified.

Figure 4:
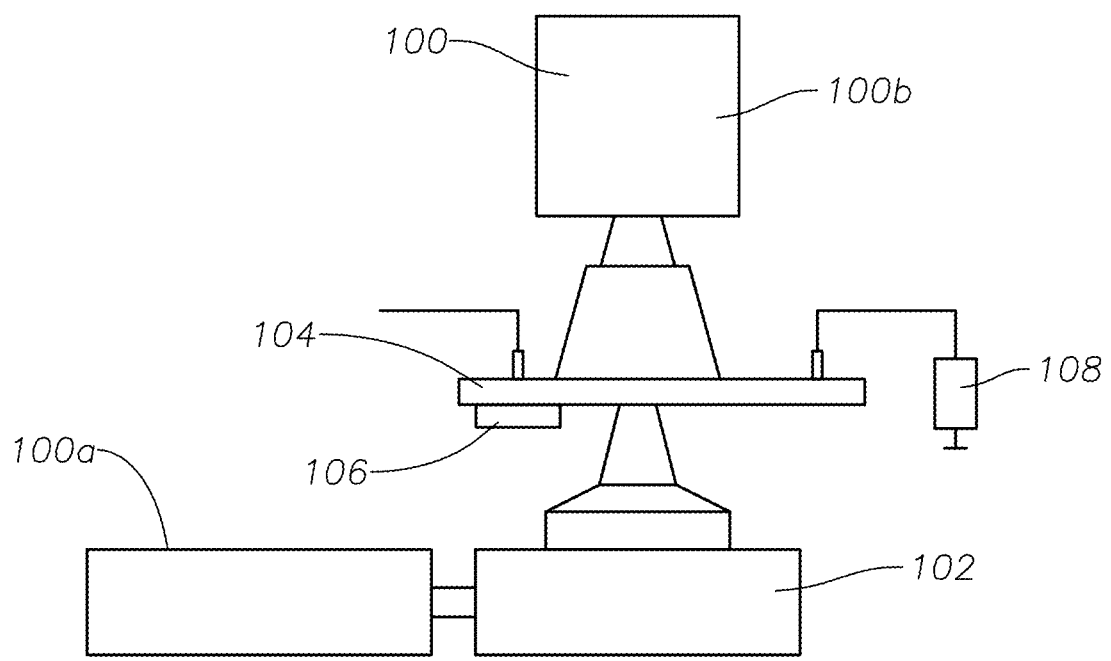
FIG. 4 is a schematic representation of the microscope assembly of the laboratory observations.

FIG. 4 shows a schematic of the experimental setup used to conduct the macroscopic and microscopic observations of the ultrasonic irradiation in the microfluidic cell. A parallel walls fluid flow cells 104 with channel internal dimensions of 100 µm thickness, 8 mm length and 38 mm width was used. A piezo-electric ceramic disc transducer 106 of 7 mm diameter and 3 mm thickness, having resonant frequency of about 300 kHz, was attached at the bottom of the cell 104 using an epoxy raisin (FIG. 2 pictures). The transducer 106 was powered using a 20 MHz function/arbitrary waveform generator, and a DC to 1 MHz high speed bipolar amplifier. In all experiments the transducer was operated using a standard setting of 300 kHz, with sinusoidal signal of 1 V amplitude from the signal generator, giving about 40 Volts amplifier output signal. The resonance frequency of the transducer was chosen so that the dimension of the cell will be a few times the wavelength, which makes it convenient for observations with the experimental setup.

The cell was mounted on the observation stage of an inverted microscope 102. A high-speed video camera 100a was attached to the side port of the microscope allowing recording of bottom view observations of the irradiation process using 10×, 20×, or 40× magnification objectives. Alternatively, the high-speed camera 100b equipped with an 85 mm lens was mounted on a vertical rail at a focal distance of about 20 cm above the cell, for the top-view macroscopic observation of the irradiation process over the entire cell. The cell inlet is connected by plastic tubing to a 10 ml syringe 108 used to introduce the studied solutions into the cell. Most of the experiments were done at static flow conditions by sealing the inlet and outlet tubing after the cell is filled with the solution. Controlled flow experiments were accomplished by mounting the syringe to an automated syringe pump.

3. Background

As a brief reference to the physical background of the acoustic separation involving the primary and secondary acoustic radiation forces and acoustic streaming, the acoustic radiation forces tend to be dominant for larger particulate sizes (>1 μm) and lower irradiation frequencies (<1 MHz), and the streaming force is more pronounced for smaller particle sizes (<1 μm) but higher acoustic frequencies (>1 MHz). The primary acoustic radiation force arises from the spatial gradient of the acoustic wave pressure. In a standing wave field the force in N in the direction of the wave the primary radiation can be expressed as:

$$F_{ac} = \frac{4\pi}{3} R^3 k E_{ac} \phi \sin(2kx) \quad (1)$$

where R is particle radius in m, $k=2\pi/\lambda$ is the wavenumber, $\lambda$ is the wavelength of the sound in m, $E_{ac}$ is the acoustic energy density in $J/m^3$, x the distance from the nodal point in m and is the acoustic contrast factor. The direction of the primary acoustic radiation force experienced by a particulate dispersed in a medium is determined from the sign of the acoustic contrast factor:

$$\phi = \frac{5\rho_p - 2\rho_m}{2\rho_p + \rho_m} - \frac{\beta_p}{\beta_m} \quad (2)$$

where ρ is the density in $kg/m^3$, β is the compressibility in $m^2/N$ and the subscripts p refers to the particulate (emulsion droplet or colloidal particle) and m to the medium. The compressibility is related to the speed of the sound, c in m/s, in the medium or in the particle:

$$\beta = \frac{1}{\rho c^2} \quad (3)$$

When subject to a standing acoustic wave field a particulate with positive acoustic contrast factor experiences a primary acoustic radiation force that drives it toward the pressure nodes in the acoustic field, e.g. zones with minimum pressure amplitude variation. Reversely, particulates with negative acoustic contrast factor are driven toward the antinodes in the acoustic field, which have maximum pressure variation. Table 1 gives the specific density and speed of sound for the particulates droplets used in our study (dodecane droplets, perfluorohexane droplets, and silica colloidal particles) and their respective acoustic contrast factor when dispersed in water medium. Dodecane and perfluorohexane droplets have a negative acoustic contrast factor, and the silica particles have a positive acoustic contrast factor when dispersed in water medium.

TABLE 1

Density, speed of sound and acoustic contrast factors of the studied medium and particulates.

|  | ρ [kg/m³] | c [m/s] | φ (in water) |
|---|---|---|---|
| Water | 1000 | 1497 |  |
| Dodecane | 800 | 1260 | −0.83 |
| Perfluorohexane | 1700 | 480 | −7.12 |
| Silica | 2400 | 5640 | +2.20 |

The secondary radiation force arises from the acoustic field reflection from the suspended particles and becomes significant once the particles are brought closer together. The secondary radiation force depends on the position of the particles with respect to the acoustic wave propagation direction. The force is repulsive between particles in the direction perpendicular to the wave front propagation but attractive in direction along the wave front propagation.

In addition to the acoustic radiation force, acoustic streaming is also induced on the suspended particles. Streaming arises because of the dissipation process in the fluid phase and in the fluid–solid interface. There are several types of streaming which are pronounced at different length scales: large scale Eckart steaming (scale >>λ) and small scale Rayleigh (scale~λ) and Schlichting (scale <<λ) streaming. In the context of the present experiment the most significant is expected to be the Rayleigh-scale streaming.

4. Results and Discussions 4.1 Oil in Water Emulsion

Figure 5:
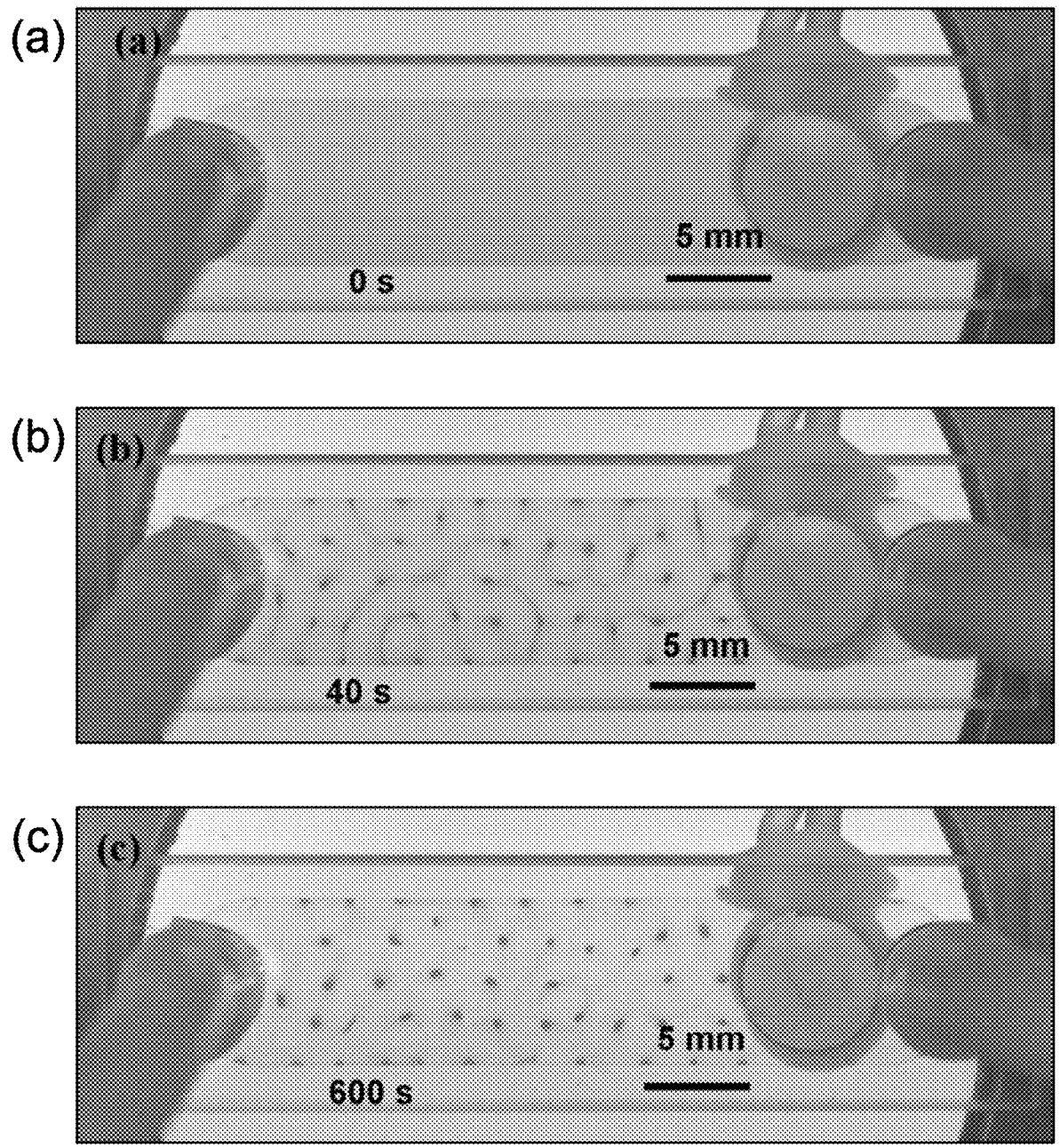
FIG. 5 includes snapshots as an example for the top-view macroscopic observations of the acoustic irradiation process in the case of fine dodecane oil droplets in water emulsion.

First the acoustic separation of dodecane emulsion droplets in the microfluidic cell were examined. FIG. 5 shows snapshots as an example for the top-view macroscopic observations of the acoustic irradiation process in the case of fine dodecane oil droplets in water emulsion. Several seconds after the initiation of the ultrasonication the formation of dark spots connected by thin lines were observed, indicating the formation of emulsion droplet clusters (FIG. 5b). The thin lines gradually fade and about 5 minutes after the start of the irradiation discrete dark spots pattern is observed (FIG. 5c). The characteristic distances been the oil droplet aggregates seen in FIG. 5c is about 2.5 mm which is closely matching half the wavelength of the acoustic wave of f=300 kHz in water, which is λ/2=c/(2f)~2.5 mm. Because of the negative acoustic contrast of the dodecane in water droplets (Table 1) it is expected that the emulsion droplets will be driven toward the acoustic field pressure antinodes.

It is noted that this type of experiment can be used as a simple method to visualize the acoustic filled pressure distribution in the cell, as alternative to particle image velocimetry (PIV) imaging. In the tested configuration the pressure antinode positions are close to the cell side walls, with three more lines of anti-nodes fitting in the space between. The position of the anti-nodes is slightly disordered because the shape of the cell is not an exact resonant cavity, but having curved end walls. Nevertheless the expected characteristic spacing of $\lambda/2$ between the cluster structures can be clearly observed.

FIG. 5 shows top-view macroscopic observations for the acoustic separation in the case of fine dodecane droplets in water emulsion: (a) before the start of the ultrasonic irradiation, (b) 40 seconds and (c) 600 seconds after the beginning of the irradiation.

The macroscopic observations give the general picture of the acoustic field distribution in the cell. As expected the larger droplets aggregate faster toward the anti-node position, i.e. in seconds. In this case strings of large droplets can be observed moving toward the cluster (FIG. 6a). In the case of the higher-concentration fine emulsion the process takes longer (minutes) with a network of droplets streams continuingly draining larger aggregates centered at the anti-nodes (FIG. 6b). Following the interruption of the ultrasonication, the oil droplets aggregate relaxes on the upper surface of the fluid cell driven by buoyancy.

FIG. 6 includes microscopic observations showing high-speed video snapshots where: (a) shows the cluster formation for the case of coarse dodecane emulsion droplets; (b) shows a high concentration fine droplets size dodecane emulsion; (c) shows an emulsion droplet cluster deposited on the cell surface at switch-off; and (d) shows an emulsion droplet cluster levitated in the pressure antinode upon the switching-on of the ultrasound.

One simple way to further manipulate the deposited aggregates is by switching on and off the acoustic field. FIG. 6 shows a few cycles of cluster relaxation (FIG. 6c) and cluster aggregation in the pressure anti-node (FIG. 6d) upon the switching on the ultrasound.

4.2 Colloidal Silica Particles Suspension

Next, experiments with colloidal silica particle suspensions were conducted. In this case monodisperse silica particles were used, allowing a more precise observation of the effect of particle size on the efficiency of the ultrasonic separation. The experiment studied 7.5 µm, 1.2 µm and 0.5 µm and 0.15 µm monodisperse silica particles in water suspensions. Since the primary acoustic radiation force is strongly dependent on the particle size to the third power of R in (Eq. 1) it is expected that smaller particles will be more difficult to aggregate. The aggregation of the larger particles is expected to be dominated by acoustic radiation forces, while for smaller particles the streaming force will be dominant. For latex particle beads solutions irradiated at 1.4 MHz the transition between radiation force and streaming driven separation is observed for particle size of about 1 micron. However, a different transition size could be expected for silica particle manipulated at the lower resonant frequency used here.

Figure 7:
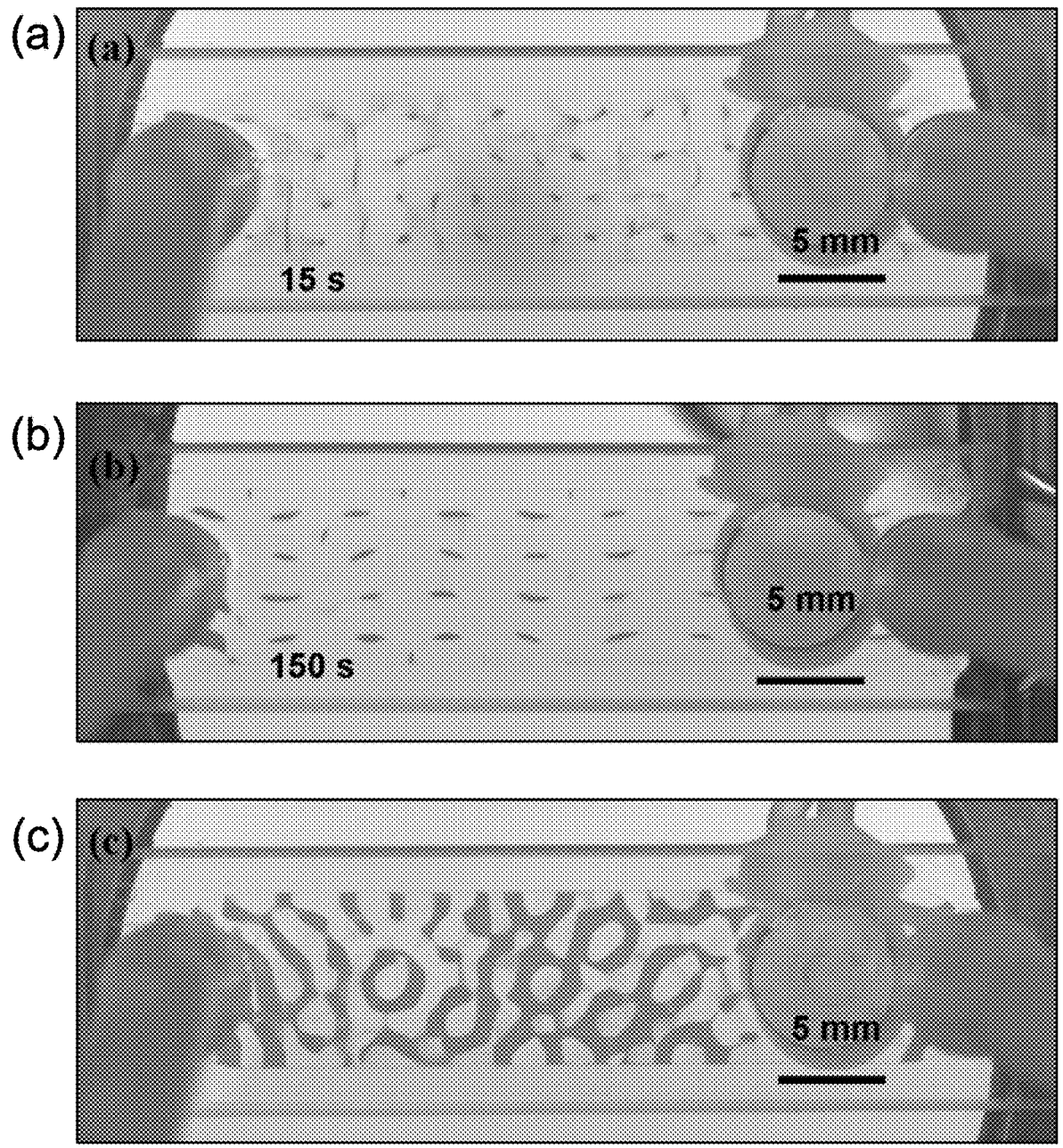
FIG. 7 includes top-view macroscopic observations for the irradiation process in the case of silica particles suspension for silica particles with various sizes.

Top-view macroscopic observation were made for the irradiation process in the case of 1 wt % of 7.5 µm silica particles suspension and FIG. 7 shows representative snapshots at 15 seconds (FIG. 7a) and at 150 seconds (FIG. 7b) after the beginning of the acoustic irradiation. A comparison between FIG. 5c for the case of dodecane droplet clusters, and FIG. 7a for 7.5 µm silica particle shortly after the beginning of the process indicates that initial positions of the silica particle aggregates are shifted by approximately $\lambda/4$ from the emulsion droplets aggregates positions. This confirms that at the first instance the positive acoustic contrast silica particles are driven toward the pressure node positions. However the neighboring clusters tend to migrate toward each other and the final pattern is of elongated shape clusters that are more sparsely separated along the cell length. As shown in FIG. 7b the final distance between the clusters positions is about 2.5 mm~$\lambda/2$ in direction perpendicular to channel transverse axis, but closer to 5.0 mm, or ~$\lambda$ in the direction along the channel length.

It was noticed in passing that in test trials with a higher concentration of about 5 wt % of 7.5 µm silica particles, a more complex dynamical pattern of particle clustering was observed as shown in FIG. 7c. In this case a network of silica particle clusters is formed with the clusters periodically shifting their orientation in a synchronized manner. The characteristic spacing of the cluster structure is about 2.5 mm or $\lambda/2$.

FIG. 7 therefore illustrates snapshots from top-view macroscopic view for the separation process in the case of case 1 wt % 7.5 µm silica particles: (a) 15 seconds; and (b) 150 seconds after the beginning of the ultrasonication. FIG. 7c illustrates the dynamic clustering pattern observed in the case of 5 wt % 7.5 µm silica particles case.

Figure 8:
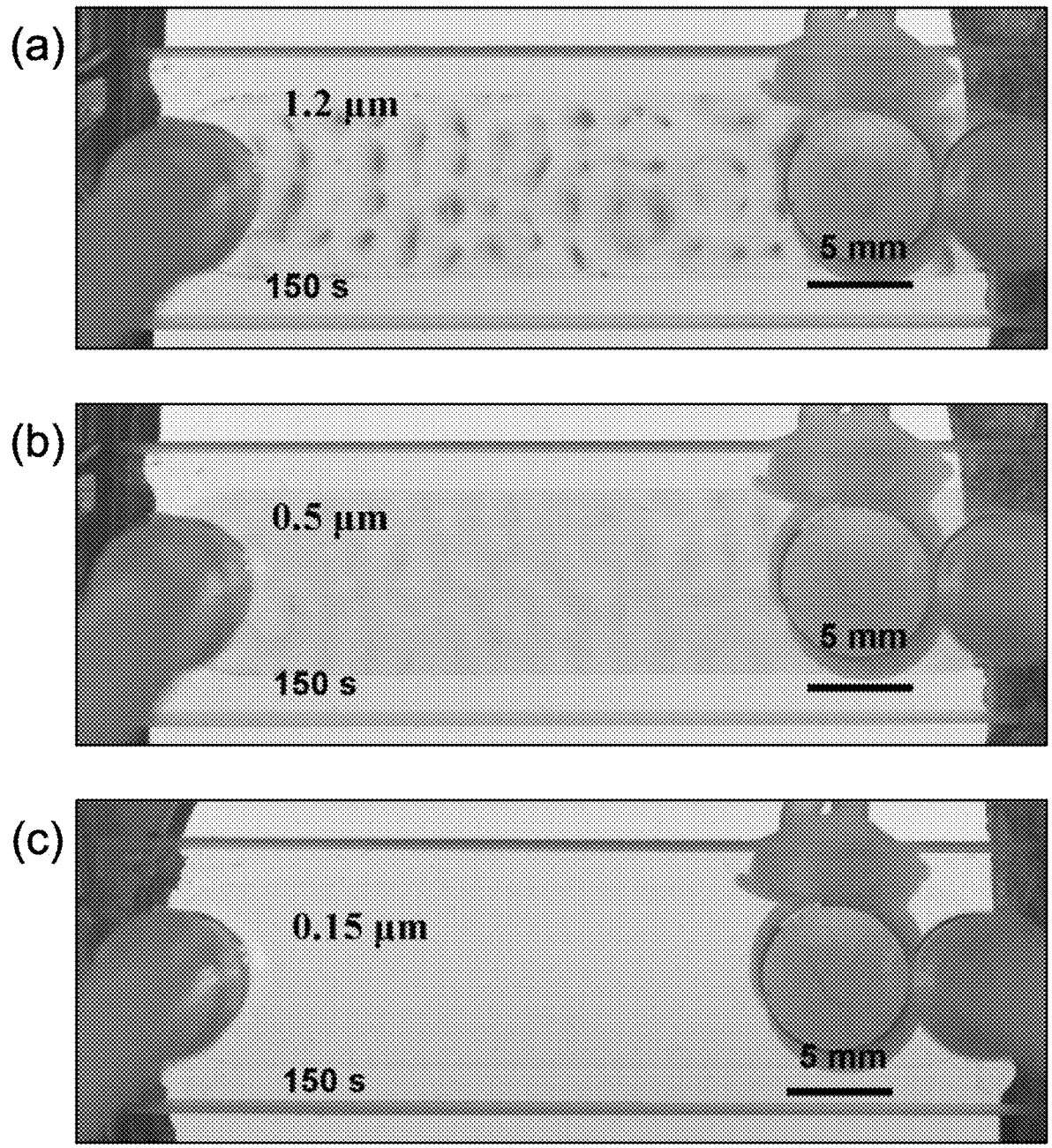
FIG. 8 includes top view snapshots of the microfluidic cell 150 seconds after the start of the irradiation for silica particles with various sizes.

Next, the particle size limit for effective acoustic separation using smaller size silica particles was investigated. Top view snapshots of the microfluidic cell 150 seconds after the start of the irradiation for the case of 1 wt % of 1.2 µm; 0.5 µm and 0.15 µm of silica particles are shown in FIG. 8a, FIG. 8b and FIG. 8c, respectively. Compared with the case of 7.5 µm silica particles at 150 seconds (FIG. 4b) it is apparent that with the decrease of the particle size the separation is less effective and takes longer time. In the case of 1.2 µm the cluster formation is clearly observed, but there is a lighter shadow around the darker central spot (FIG. 8a). For 0.5 µm the aggregates pattern starts to emerges after 150 second (FIG. 8b), but it takes much longer, 5 to 10 minutes, for the clear formation of darker spots at the cluster cores. For the case of 0.12 µm silica particle there was no visible signs of cluster formation and the color of the suspension in the cell remained uniform (FIG. 8c) even after 15 minutes of continuous irradiation.

Figure 9:
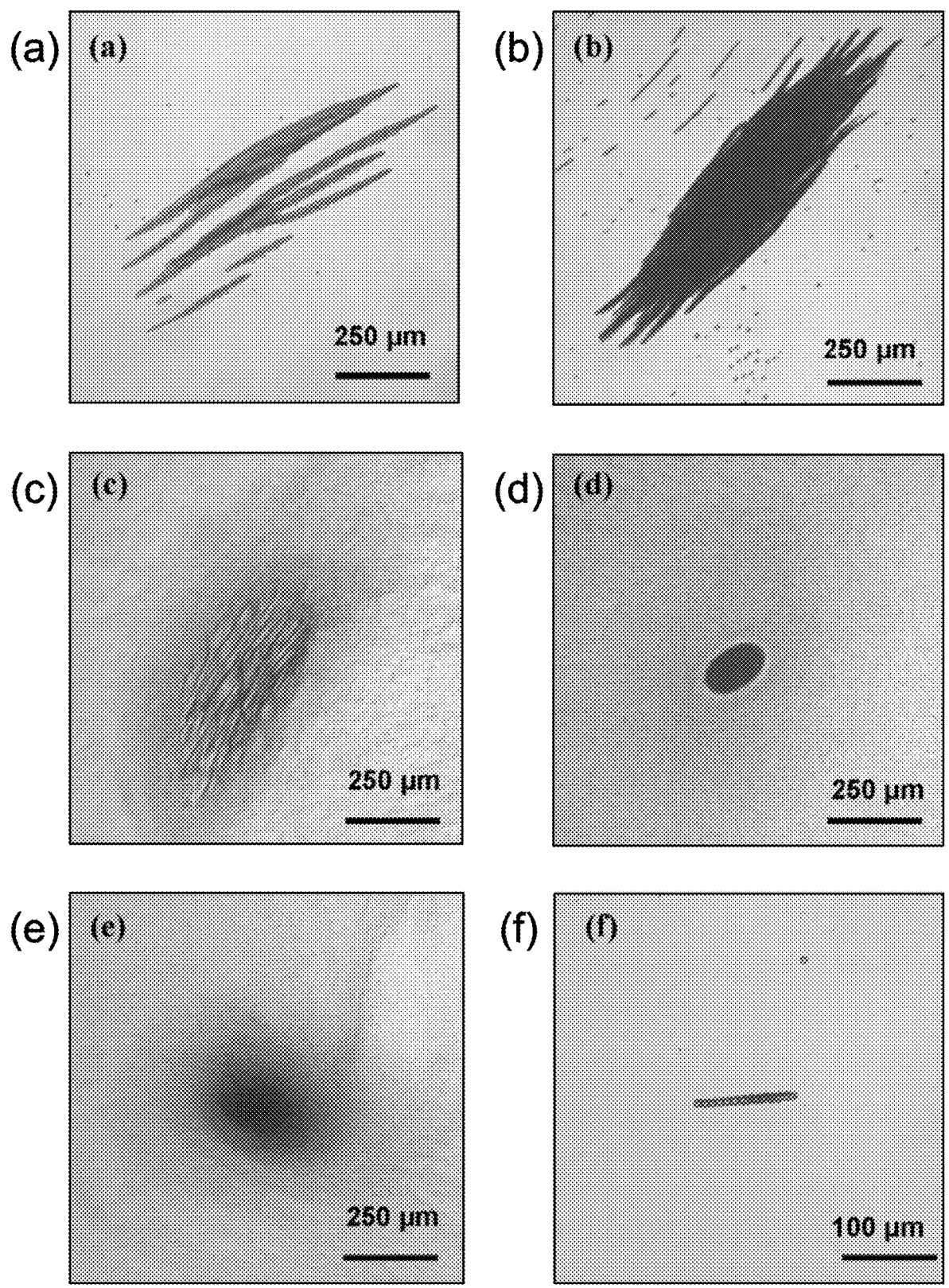
FIG. 9 includes microscopic high-speed observation of silica particle clusters for various silica particles sizes.

A more detailed understanding of the clustering, in case of different silica particle sizes, can be obtained from the microscopic observation of the process. FIG. 9 shows microscopic high-speed observation for the various silica particles sizes. FIGS. 9a and 9b are examples for a small and a large cluster of 7.5 µm silica particle aggregates. The 7.5 microns clusters have well pronounced parallel strings of particles. The formation of these particle strings can be explained by the action of secondary acoustic radiation forces. The secondary radiation force between two particles is attractive in the direction of the axis perpendicular to the wave propagation, but repulsive in the direction of the acoustic wave propagation and thus will favor the microparticles string alignment in the direction of the axis perpendicular to the wave propagation. Similar tendency for particulates strings formation was also noticed in the case of larger emulsion droplets (FIG. 6a), but was more clearly observed for the 7.5 µm silica particle case, probably due to the monodispersity of the silica particles samples, whereas the droplets are polydisperse.

FIGS. 9c and 9d are examples of 1.2 µm silica particles clusters. In the case shown in FIG. 9c a distinct string sub-structure of the cluster is observed similar to the case of 7.5 µm particles. However this order could be lost and a vortex type cluster develops as demonstrated in FIG. 9d. This is an indication that for this particle size both radiation and streaming forces are involved in the clustering process. FIG. 9e shows a vortex structure core observed after about 5 minutes of irradiation in the case of 0.5 µm silica particles, indicating that for that particle size the acoustic clustering is still possible but is now dominated by the streaming acoustic forces. FIG. 9f shows the case of 0.15 µm particle suspension after 10 minutes of irradiation. In this case a trace amount of 7.5 microns silica particles were dispersed to mark the position of the pressure nodes. The image of FIG. 9f does not show any change of color in accordance with the macroscopic observation, indicating that the acoustic irradiation under these experimental conditions is not an effective way to cluster the 0.15 µm silica samples.

4.3 Dodecane Droplets—Silica Particles Mixtures

Figure 10:
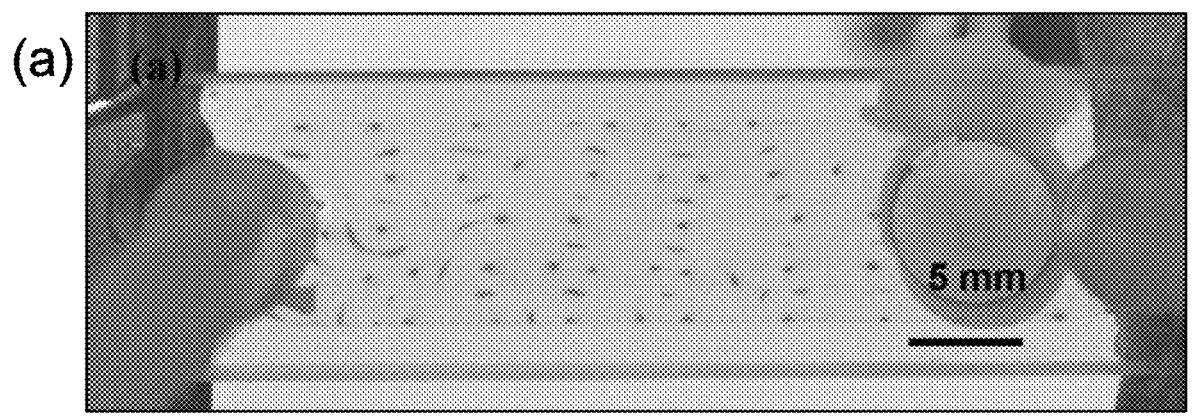
FIG. 10 includes views of the acoustic separation of a mixture in the fine dodecane droplets and 7.5 μm silica particles.
Figure 10:
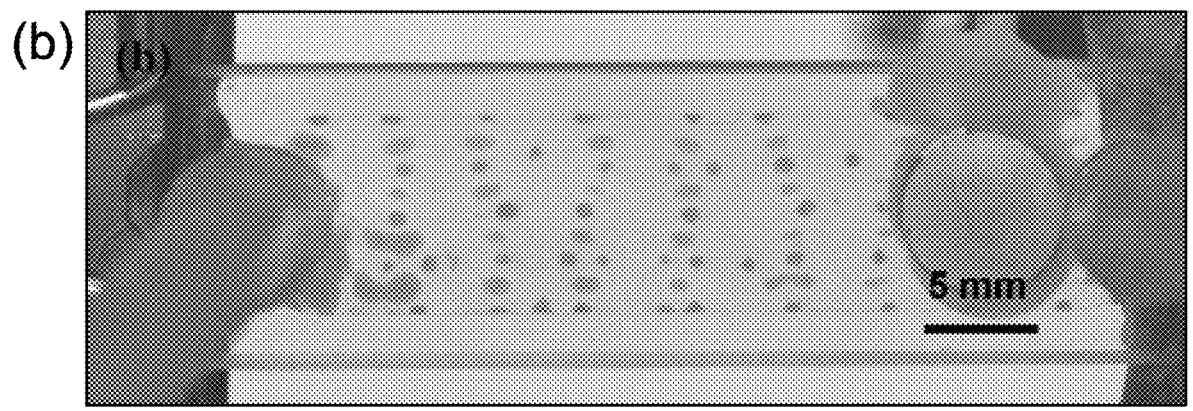

The case of a mixture emulsion droplets and colloidal particles was then investigated. The investigation used 2 wt % of dodecane droplets and 1 wt % of 7.5 µm or 1.2 µm silica particles in deionized water. In both cases it was possible to achieve acoustic separation of the initially homogeneous mixture of the two into discreet dodecane droplets and silica particle clusters. A macroscopic observation of the acoustic separation of a mixture in the fine dodecane droplets and 7.5 µm silica particles is demonstrated in FIG. 10 shows snapshots from this video. After about 150 seconds one can observe the formation of darker circular-shape droplet clusters separate from lighter elongated cluster of silica particles (FIG. 10a).

The difference between the emulsion droplets and silica particle clusters can be even more clearly observed shortly after the ultrasonication is interrupted and buoyancy separated the two as shown in FIG. 10b. Here the darker round spots are the emulsion droplet clusters deposited at the upper wall of the cell and the lighter intensity elliptic spots are the silica particle clusters deposited at the bottom of the cell. The approximate spacing between two droplet clusters or between two particle clusters is close to the spacing between those clusters in the case of a single component solution. However, the positions of the clusters in the mixture case is not an exact superposition of the single components cluster positions (FIG. 5c and FIG. 5b), implying a certain degree of interplay between the emulsion droplets and silica particle clusters.

A detailed view of the coexistence and interplay between the dodecane droplets and silica particle clusters during the separation is given by the high-speed video microscopic observations. FIG. 12a is a snapshot for the case of coarse emulsion droplets and 7.5 µm silica particles cluster and FIG. 12b is a snapshot for the case of the fine emulsion droplets and 1.2 µm silica particles. The average distance between the silica particle and dodecane droplets cluster shown in these figures is about 1.1 mm close to, but not exactly equal the expected λ/4 spacing between the node and antinodes positions, which is about 1.25 mm. This confirms the macroscopic observation of some degree of interplay between the clusters. Similarly the emulsion droplet and silica particle clusters have similar sub-structures to the one observed for the single components cases. However, the videos that were recorded show a more complex dynamical interaction with the particles and droplets circulating are reflected between the clusters, even in the case of larger particulates and more pronounced for smaller particulates due to the stronger involvement of the vortex forming streaming forces.

The same experiment was repeated using the fine-size perfluorohexane emulsion droplets and observed a similar picture for the particle and droplet separation as shown in FIG. 12c for 1.2 µm silica particles in the mixture. This confirms that acoustic separation of solid particles and emulsion droplets can work effectively for emulsion droplets components which are heavier then water, and otherwise could not be separated from the solid component using gravitationally stratification.

Figure 12:
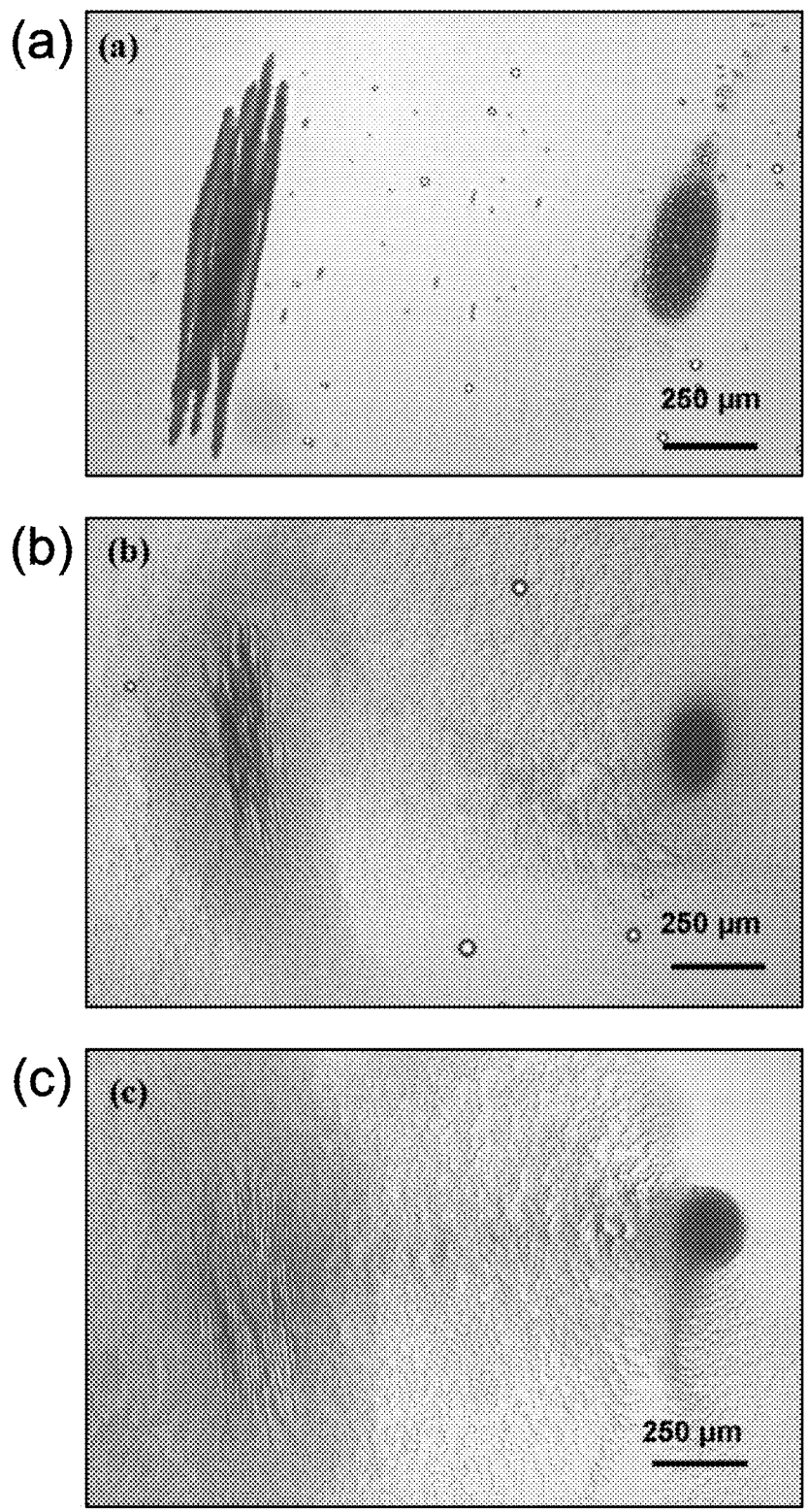
FIG. 12 includes detailed view of the coexistence and interplay between the dodecane droplets and silica particle clusters during the separation.

FIG. 12 shows microscopic high-speed video snapshots taken using a 10× objective showing separate clustering of silica particle and dodecane droplets during the mixtures irradiation. FIG. 12a shows a 7.5 µm silica particle cluster on left and a coarse dodecane droplets cluster on right. FIG. 12b shows 1.2 µm silica particle clusters on left and fine dodecane droplets cluster on right. FIG. 12c shows 1.2 µm silica particles on the left and fine perfluorohexane droplets cluster on the right.

Proof of concept experiments were performed to demonstrate the capability of acoustic microfluidics for separating emulsion droplets and solid particle using a continuous fluid flow process. In these experiments syringe connected to the cell inlet connected syringe was mounted on syringe pump allowing controlled duration and speed of fluid flow pulses, to be applied through the cell. Following 30 seconds of ultrasonication at static flow, a 5 mm/second fluid flow is applied for 30 seconds, and then the same cycle is repeated again. As shown in FIG. 11a, during the continuous-flow-phase three streams of concentrated emulsion droplets are formed along the pressure antinode positions along the cell and draining out through the cell outlet. In FIG. 11b, the case of a mixture of emulsion droplets and silica particles is presented. Here seven lines formed along the cell length streaming toward the outlet. Three of them are emulsion droplets streams going through the antinodes positions and four are concentrated silica particles streams passing through the respective pressure-node positions along the cell, as arrowed in FIG. 11b. The microfluidic cell used here was not specifically designed for the collection of the concentrated emulsion droplet and silica particles streams at the cell outlet. Nevertheless these preliminary experiments demonstrate the potential for the operation of microfluidic devices in constant flow mode to separate components from a mixture of particulates with different acoustic-contrast.

Figure 11:
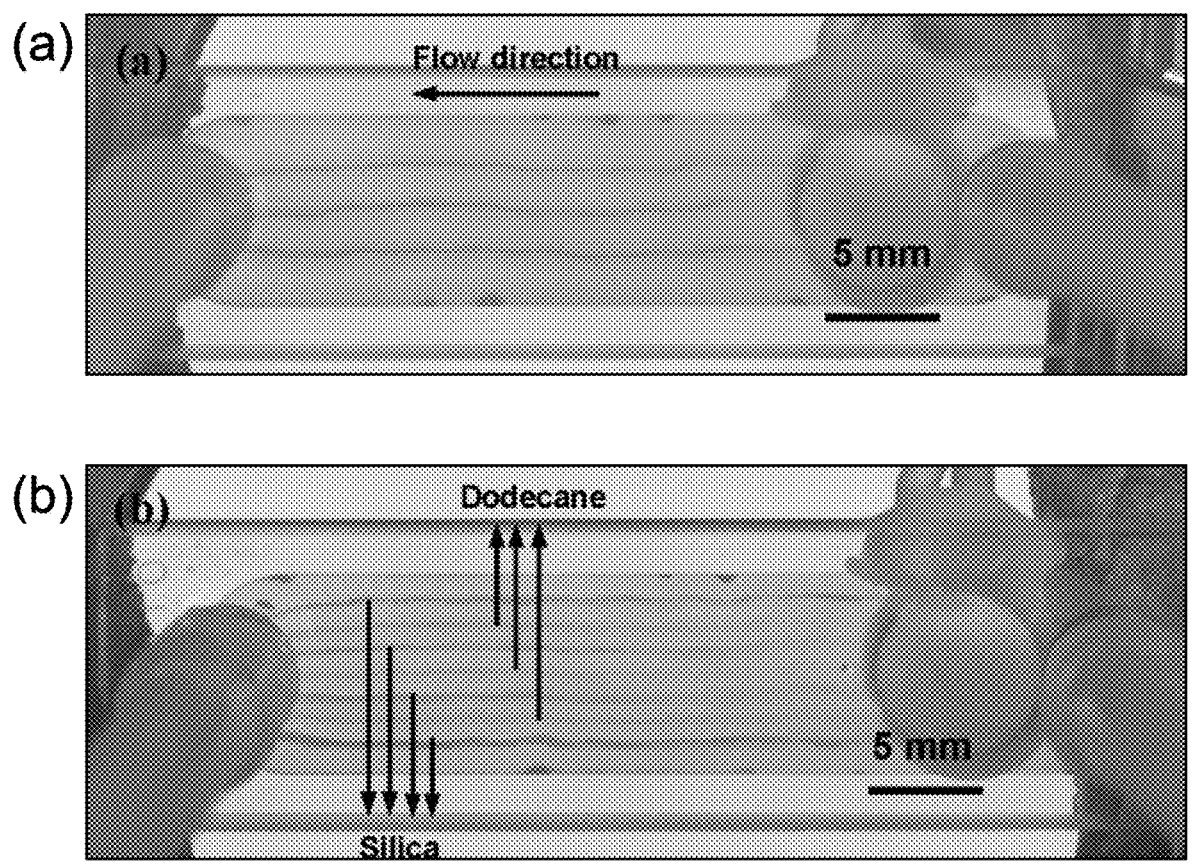
FIG. 11 shows acoustic separation in a continuous-flow illustrating microfluidic system.

FIG. 11 shows acoustic separation in a continuous-flow illustrating microfluidic system. FIG. 11a shows dodecane droplets emulsion. Three streams of droplets passing along the antinode positions during the 5 mm/second fluid flow phase. FIG. 11b shows a dodecane droplets and 7.5 µm silica particle mixture. The four wider streams of silica particles and three lighter colored streams of dodecane droplets at the node and antinode planes respectively.

5. Conclusions

An experimental setup based on a simple flat-channel microfluidic cell and high-speed video camera observations was introduced, which can be used in pilot studies of the ultrasonic separation of complex particulates mixtures, and which are relevant to applications in the crude-oil-production industries. The model system was aqueous solutions of dodecane oil emulsion droplets and silica colloidal particles. The cell dimensions combined with the selection of a 300 KHz resonant frequency piezo electric transducer allow for macroscopic observations that characterize the acoustic field distribution in the cell, combined with additional detailed microscopic observations of the particulates clustering process. Initially the separation process was characterized as a single particulate or droplet type. The experiment with dodecane emulsion droplets experiments gave an easy way to find the node of the acoustic field pressure distribution, and the experiment with monodisperses silica particles allowed us to establish the effect of particle-size on the separation efficiency. The separation of 7.5 µm silica particles was driven mostly by acoustic radiation forces, the 1.2

µm particles by both radiation and streaming, and the 0.5 µm particles mostly by vortex forming streaming. Furthermore, the separation effectiveness for a mixture of solid particles and emulsion droplets was demonstrated. This included detailed microscopic observation of particle and droplet clusters coexistence in mixtures containing 7.5 µm and 1.2 µm silica particle, dodecane oil droplets or heavier perfluorohexane oil droplets. Finally a proof of concept acoustic-separation experiments for the continuous fluid flow emulsion of droplets and solid particles was conducted, which can be used in further development of more sophisticate acoustofluidics based testing platforms.

Embodiments of this disclosure therefore provide both financial and environmental advantages over some known hydrocarbon production systems, such as: reducing the volume of produced water and necessary surface facilities for handling produced water; reducing the amount of corrosion and scale accumulated on production pipes over time; the reduction of the number of disposal wells to be drilled; and the reduction of risks associated with injecting contaminated water into the formation.

Embodiments of the systems and methods described in this disclosure, therefore, are well adapted to carry out the objects and attain the ends and advantages mentioned, as well as others inherent in embodiments described in this disclosure. While example embodiments of the disclosure have been given for purposes of disclosure, numerous changes exist in the details of procedures for accomplishing the desired results. These and other similar modifications will readily suggest themselves to those skilled in the art, and are intended to be encompassed within the spirit of the disclosure and the scope of the appended claims.

What is claimed is:

1. A method for separating hydrocarbon fluids from water and solid material within a main tubular of a subterranean well, the main tubular having a central axis, the method comprising:

sealing an annular space between an outer diameter of the main tubular and an inner diameter of the subterranean well with an outer packer;

locating a transducer assembly within the subterranean well uphole of the outer packer by lowering a downhole tool having the transducer assembly into the subterranean well so that the transducer assembly is located around the outer diameter of the main tubular, the transducer assembly including a plurality of piezo electric transducers spaced along a length of the downhole tool, the downhole tool being selectively removeable from the subterranean well;

providing a production tubular in the subterranean well, where a downhole end of the production tubular is located uphole of the transducer assembly;

separating the oil droplets from the water simultaneously with directing the solid material in a direction away from the oil droplets by generating standing acoustic waves with the plurality of piezo electric transducers, the standing acoustic waves passing through the main tubular transverse to the central axis; and aligning a solid particle filter with a pressure node of an uppermost standing acoustic wave of the standing acoustic waves; wherein a number of loops of the standing acoustic waves decrease in a direction of flow of the fluids through the main tubular so that the oil droplets coalesce at a pressure antinode of the uppermost standing acoustic wave and the solid material clusters at the pressure node of the uppermost standing acoustic wave;

the downhole end of the production tubular is aligned with the pressure antinode of the uppermost standing acoustic wave for producing the oil droplets to a wellhead; and a dirty water is directed axially through the solid particle filter, filtering the solid material from a dirty water stream of the fluids to form a clean water.

2. The method according to claim 1, wherein the step of generating standing acoustic waves includes providing power to the transducer assembly from a power source outside of the subterranean well.

3. The method according to claim 1, wherein a central axis of the production tubular is coaxially aligned with the central axis of the main tubular.

4. The method according to claim 1, further comprising injecting the clean water into a hydrocarbon formation through a water injection line that extends from uphole of the transducer assembly to downhole of the outer packer.

5. The method according to claim 1, wherein the step of generating standing acoustic waves includes generating standing acoustic waves with pressure nodes adjacent to a sidewall of the main tubular and having a number of pressure antinodes that is one less than a number of pressure nodes.

6. The method according to claim 5, further comprising aligning the solid particle filter with the pressure node adjacent to a sidewall of the main tubular to filter the solid material from the dirty water stream to form the clean water.

7. A method for separating hydrocarbon fluids from water and solid material within a main tubular of a subterranean well, the main tubular having a central axis, the method comprising:

sealing an annular space between an outer diameter of the main tubular and an inner diameter of the subterranean well with an outer packer;

locating a transducer assembly within the subterranean well uphole of the outer packer by lowering a downhole tool having the transducer assembly into the subterranean well so that the transducer assembly is located around the outer diameter of the main tubular, the transducer assembly including a plurality of piezo electric transducers spaced along a length of the downhole tool, the downhole tool being selectively removeable from the subterranean well;

locating a production tubular within the main tubular in the subterranean well, defining an annular space between an inner diameter surface of the main tubular and an outer diameter surface of the production tubular, the annular space being a water conduit, and where a downhole end of the production tubular is located uphole of the transducer assembly;

locating a solid particle filter within the water conduit;

separating the oil droplets from the water and simultaneously directing the solid material in a direction away from the oil droplets by generating standing acoustic waves with the plurality of piezo electric transducers, the standing acoustic waves passing through the fluids flowing in the main tubular so that the oil droplets coalesce at a pressure antinode of an uppermost standing acoustic wave of the standing acoustic waves and the solid material clusters at a pressure node of the uppermost standing acoustic wave; wherein the uppermost standing acoustic wave has the pressure antinode axially registered with the production tubular that extends to an upper end of the subterranean well for producing the oil droplets to a wellhead;

the uppermost standing acoustic wave has the pressure node aligned with the solid particle filter so that a dirty water is directed axially through the solid particle filter, filtering the solid material from a dirty water stream of the fluids to form a clean water that is delivered through the water conduit; and a number of pressure antinodes of each other standing acoustic wave is at least equal to a number of pressure antinodes of the uppermost standing acoustic wave.

8. The method according to claim 7, further comprising tuning the standing acoustic waves with a controller outside of the subterranean well, to adjust a number of loops and amplitude of the standing acoustic waves.

9. The method according to claim 7, wherein the step of generating standing acoustic waves includes generating standing acoustic waves with pressure antinodes adjacent to a sidewall of the main tubular and having a number of pressure nodes that is one less than a number of pressure antinodes.

10. A system for separating hydrocarbon fluids from water and solid material within a main tubular of a subterranean well, the main tubular having a central axis, the system including:

an outer packer sealing an annular space between an outer diameter of the main tubular and an inner diameter of the subterranean well a production tubular in the subterranean well;

a transducer assembly located within the subterranean well uphole of the outer packer the transducer assembly being part of a downhole tool that is lowered into the subterranean well so that the transducer assembly is located around the outer diameter of the main tubular, the transducer assembly including a plurality of piezo electric transducers spaced along a length of the downhole tool, the downhole tool being selectively removeable from the subterranean well, where a downhole end of the production tubular is located uphole of the transducer assembly; wherein the piezo electric transducers are located to generate standing acoustic waves passing through the main tubular in a direction transverse to the central axis; and the piezo electric transducers are aligned and operable to separate the oil droplets from the water and to simultaneously direct the solid material in a direction away from the oil droplets by generating standing acoustic waves with a number of loops that decrease in a direction of flow of the fluids through the main tubular; where a solid particle filter is aligned with a pressure node of an uppermost standing acoustic wave of the standing acoustic waves, the solid particle filter operable to filter the solid material from a dirty water stream of the fluids traveling axially through the solid particle filter to form a clean water for injection into a hydrocarbon formation; and the downhole end of the production tubular is aligned with a pressure antinode of the uppermost standing acoustic wave for producing the oil droplets to a wellhead.

11. The system according to claim 10, further comprising a power source located outside of the subterranean well and in electrical connection with the transducer assembly.

12. The system according to claim 10, wherein a central axis of the production tubular is coaxially aligned with the central axis of the main tubular.

13. The system according to claim 10, further comprising a controller operable to tune the standing acoustic waves to adjust a number of loops and amplitude of the standing acoustic waves, the controller being located outside of the subterranean well.

14. The system according to claim 10, further comprising a water conduit located in the subterranean well, the water conduit having an end axially registered with a pressure node of the uppermost standing acoustic wave.

15. The system according to claim 14, wherein the water conduit is adjacent to a sidewall of the main tubular.

* * * * *